(12) United States Patent
Einberg et al.

(10) Patent No.: US 11,069,167 B2
(45) Date of Patent: Jul. 20, 2021

(54) METHOD AND SYSTEM FOR AUTOMATED PHYSICAL ACCESS CONTROL SYSTEM USING BIOMETRIC RECOGNITION COUPLED WITH TAG AUTHENTICATION

(71) Applicant: ASSA ABLOY AB, Stockholm (SE)

(72) Inventors: Fredrik Einberg, Huddinge (SE); Philip Hoyer, Richmond (GB); Julian Lovelock, Pleasanton, CA (US); Robert Rowe, Corrales, NM (US)

(73) Assignee: ASSA ABLOY AB, Stockholm (SE)

( * ) Notice: Subject to any disclaimer, the term of this patent is extended or adjusted under 35 U.S.C. 154(b) by 136 days.

(21) Appl. No.: 16/323,199

(22) PCT Filed: Aug. 7, 2017

(86) PCT No.: PCT/IB2017/001114
§ 371 (c)(1),
(2) Date: Feb. 4, 2019

(87) PCT Pub. No.: WO2018/025086
PCT Pub. Date: Feb. 8, 2018

(65) Prior Publication Data
US 2019/0172281 A1 Jun. 6, 2019

Related U.S. Application Data

(60) Provisional application No. 62/371,477, filed on Aug. 5, 2016.

(51) Int. Cl.
*G07C 9/25* (2020.01)
*G07C 9/00* (2020.01)
(Continued)

(52) U.S. Cl.
CPC .............. *G07C 9/257* (2020.01); *G06F 3/013* (2013.01); *G06K 9/00255* (2013.01);
(Continued)

(58) Field of Classification Search
None
See application file for complete search history.

(56) References Cited

U.S. PATENT DOCUMENTS 10,032,327 B1 * 7/2018 Xin .................... G06K 9/00255
2013/0251216 A1 9/2013 Smowton et al.
(Continued)

FOREIGN PATENT DOCUMENTS

CN 101236599 8/2008
CN 104912432 9/2015
(Continued)

OTHER PUBLICATIONS

"European Application Serial No. 17791447.0, Response filed Sep. 13, 2019 to Office Action dated Mar. 12, 2019", 13 pgs.
(Continued)

*Primary Examiner* — Carlos Garcia
(74) *Attorney, Agent, or Firm* — Schwegman Lundberg & Woessner, P.A.

(57) ABSTRACT

An access control system is described along with a method for operating the system. In one example, a system and method are disclosed that provide a hands-free solution thereby enabling a user to walk through a door or portal with no stop in motion and limited to no interaction or user effort. Security of the system is still maintained even though user interactions are significantly decreased.

20 Claims, 14 Drawing Sheets

(51) Int. Cl.
　　　G06K 9/00　　　　(2006.01)
　　　G07C 9/27　　　　(2020.01)
　　　G06F 3/01　　　　(2006.01)
(52) U.S. Cl.
　　　CPC ..... G07C 9/00563 (2013.01); G07C 9/00571 (2013.01); G07C 9/27 (2020.01); G07C 2209/63 (2013.01)

(56) References Cited

U.S. PATENT DOCUMENTS

| | | | |
|---|---|---|---|
| 2015/0028996 A1 | 1/2015 | Agrafioti et al. | |
| 2015/0227923 A1 | 8/2015 | Kutsch et al. | |
| 2020/0267144 A1* | 8/2020 | Wagner | G06F 21/6245 |
| 2020/0334930 A1* | 10/2020 | Masood | G07C 9/27 |

FOREIGN PATENT DOCUMENTS

| | | |
|---|---|---|
| CN | 105118125 | 12/2015 |
| CN | 105260757 | 1/2016 |
| CN | 105574960 | 5/2016 |
| CN | 109716402 A | 5/2019 |
| WO | WO-2008036897 A1 | 3/2008 |
| WO | WO-2011109005 A1 | 9/2011 |
| WO | WO-2018025086 A1 | 2/2018 |

OTHER PUBLICATIONS

"International Application Serial No. PCT/IB2017/001114, International Search Report dated Dec. 12, 2017", 4 pgs.
"International Application Serial No. PCT/IB2017/001114, Written Opinion dated Dec. 12, 2017", 8 pgs.
"Chinese Application Serial No. 201780057486.4, Office Action dated Dec. 17, 2020", w/ English Translation, 25 pgs.

* cited by examiner

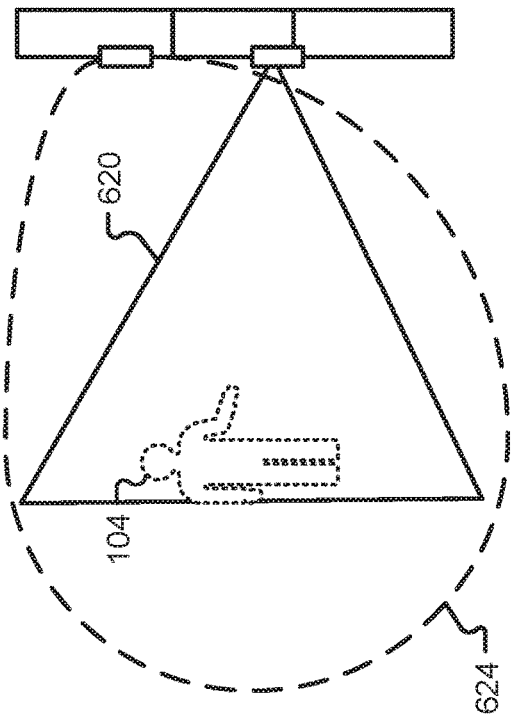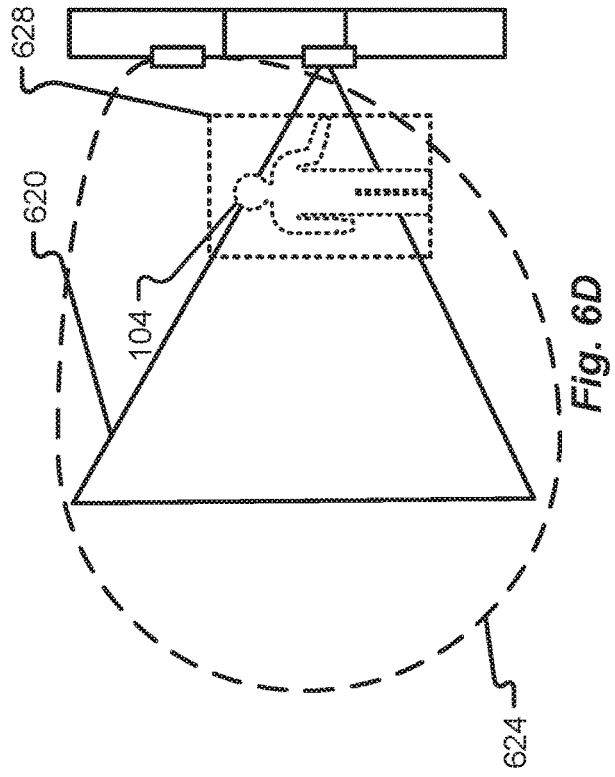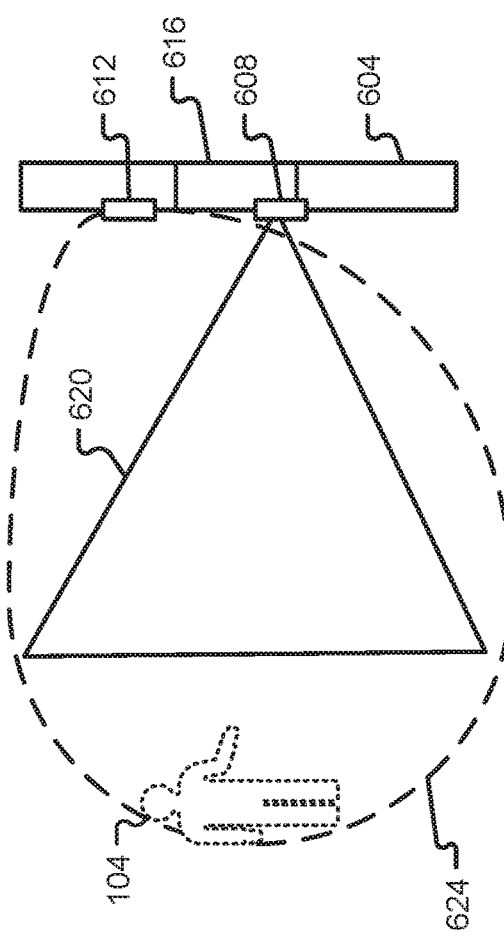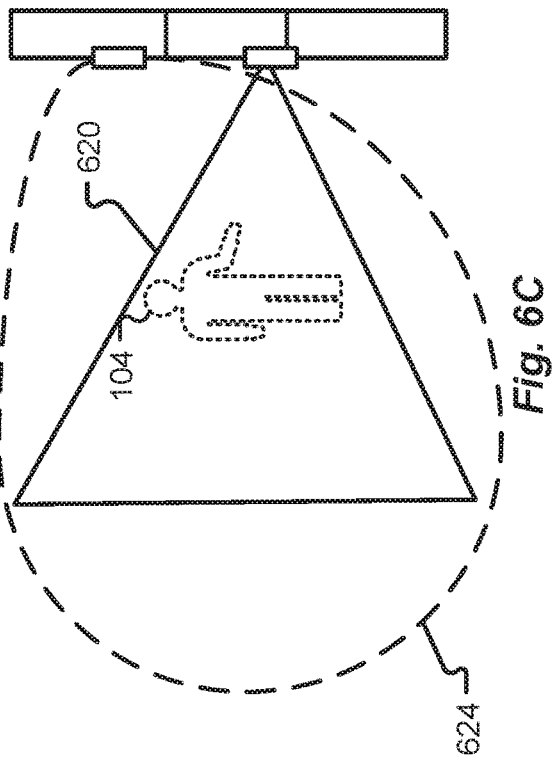

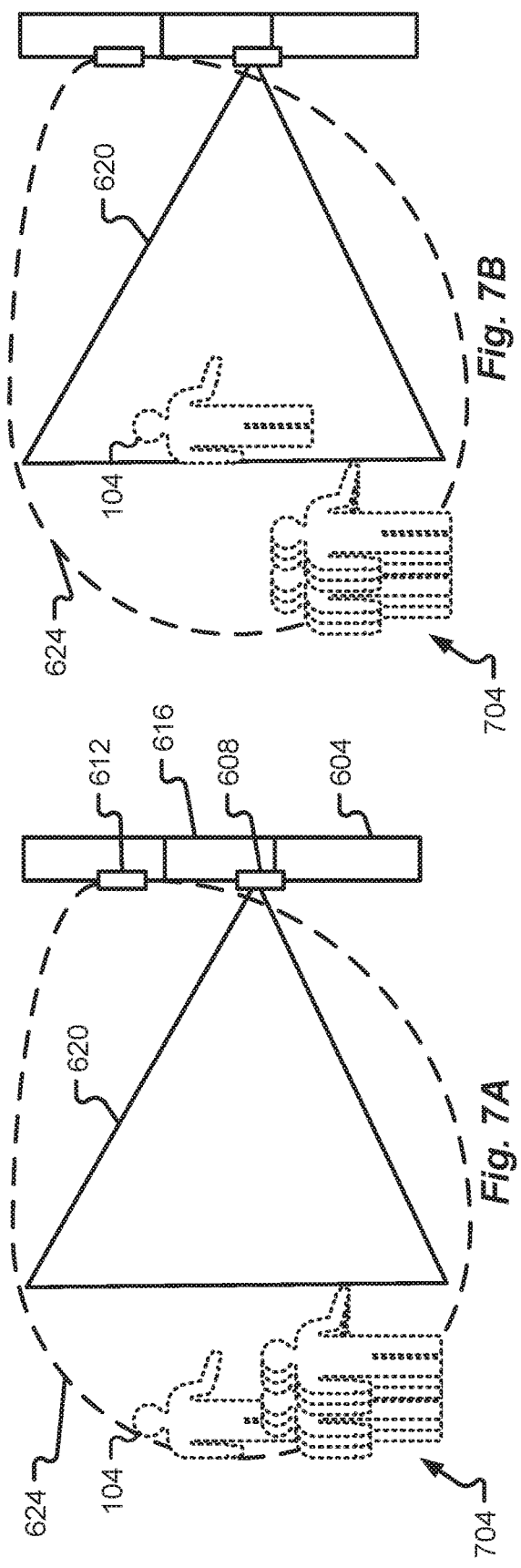
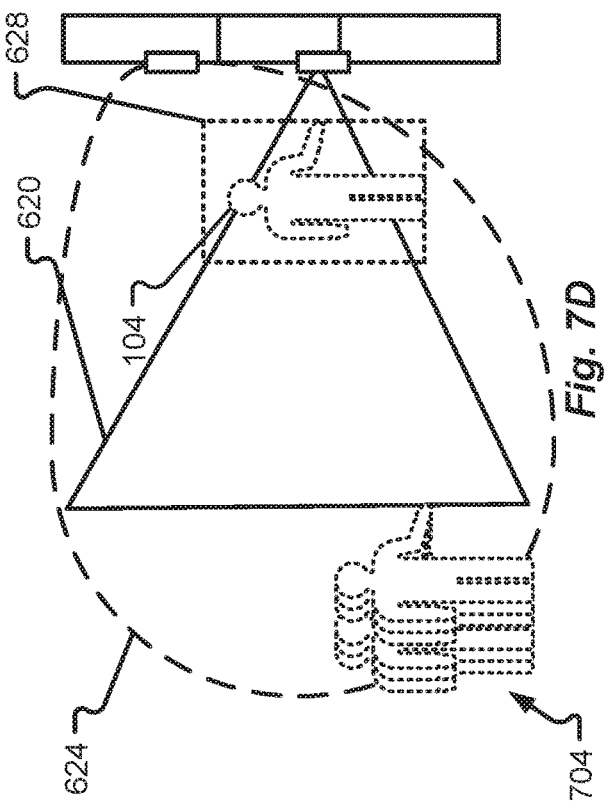
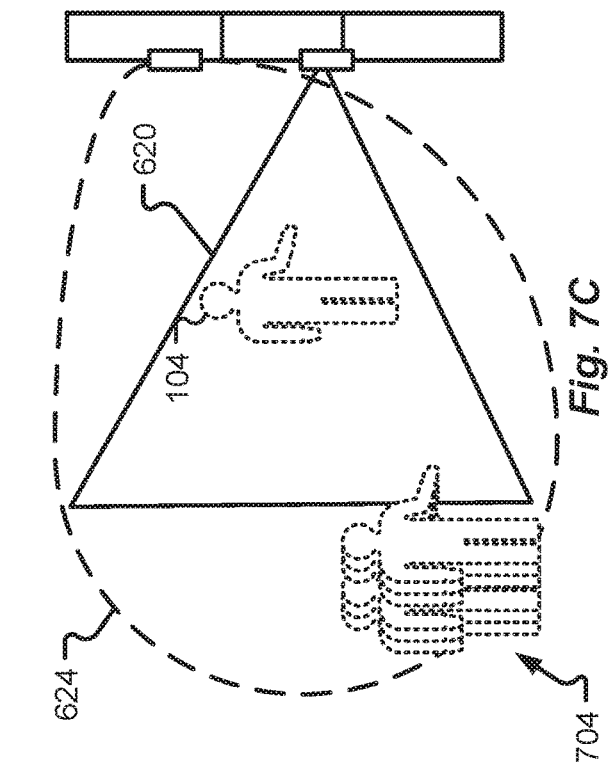
Fig. 7A
Fig. 7B
Fig. 7C
Fig. 7D

METHOD AND SYSTEM FOR AUTOMATED PHYSICAL ACCESS CONTROL SYSTEM USING BIOMETRIC RECOGNITION COUPLED WITH TAG AUTHENTICATION

CROSS REFERENCE TO RELATED APPLICATIONS

The present application is a U.S. National Stage Filing under 35 U.S.C. § 371 from International Application No. PCT/IB2017/001114, filed on Aug. 7, 2017, and published as WO 2018/025086, which claims the benefits of and priority, under 35 U.S.C. § 119(e), to U.S. Provisional Application Ser. No. 62/371,477, filed on Aug. 5, 2016, the entire disclosures of which are hereby incorporated by reference, in their entireties, for all that they teach and for all purposes.

FIELD

The present disclosure is generally directed to access control systems and more specifically to automated or semi-automated access control systems or components therein.

BACKGROUND

Automated doors, while highly convenient and capable of facilitating a high throughput, lack the security desired by many organizations, enterprises, and governmental entities. Accordingly, most physical access control systems are installed with a preference given to maintaining security as compared to enabling efficient use.

SUMMARY

Embodiments of the present disclosure enable an automated access control point (e.g., a door) to simultaneously provide efficient use as well as maintain desired levels of security. In particular, embodiments of the present disclosure envision a frictionless entry solution for automated doors in commercial and enterprise buildings with high throughput (e.g., perimeter doors). As used herein, the term "frictionless" refers to a system that enables a user to enter and/or exit a physical access control point without having to physically present a credential or badge to a reader or perform any other proactive movement that would otherwise inconvenience the user (e.g., by having to take a phone or physical credential out of a pocket, purse, bag, or the like). Rather, a "frictionless" solution refers to a solution that enables a user to pass through a physical access control point without an undue burden incumbent on the user. Some gestures may be requested of the user, but no gestures should be overly burdensome and should not require a user to move objects into/out of other locations.

In some embodiments, a hands free solution is proposed that enables a user to walk through a door with no stop in motion and no user interaction other than looking at the door (or, for example, a camera near a door). Compared to RFID, the solution proposed herein shall be better or equal in terms of security, speed and reliability.

In some embodiments, a reader that is equipped to communicate wirelessly (e.g., via NFC, Bluetooth, Bluetooth Low Energy (BLE), 802.11x protocols, etc.) with access control credentials (e.g., access control cards, smartphones, key fobs, wearable devices, etc.) is used to sense vicinity of an access control credential via some proximity detection mechanism (e.g., via measuring Received Signal Strength Indicator (RSSI) or some other measurement of the power present in a received radio signal).

By using only an RF credential and RSSI information it is hard to realize a secure and reliable keyless entry system because of difficulties in accurately determining if a credential is on the outside or inside of the door or if a user has intent of opening the door.

Biometrics like face recognition can be used to create a frictionless user experience. However, it is hard to provide good security if there is many users enrolled in the system. In general, biometrics of today are not suitable for identification or 1:N matching if N is large. Typically, N has to be <10 for good security. In an office environment, N can easily grow beyond 1000 reducing the security provided by a single-factor biometric system.

In the proposed embodiments, a combination of RF credentials, RF based positioning and biometrics are used. In a basic configuration, the reader senses the proximity of the RF credentials (e.g., via RSSI or ToF) and reads their corresponding IDs.

When a user engages the biometrics sensor (e.g., the user's face gets in the camera field of view in case of face recognition) the biometrics image is matched to the templates stored in the reader associated with the credential IDs in proximity. By doing so, N is reduced significantly (e.g., N<10) in the biometric identification (1:N matching) step. Hence, the second factor security provided by the biometrics is increased.

This ultimately enables the reader to make a positive assessment of the user's identity as well as confirm that the user is carrying a valid access control credential prior to the user physically reaching the door.

As mentioned above, user intent to enter a door can also be analyzed and leveraged to help with the functionality of the system. In particular, embodiments of the present disclosure facilitate the ability to detect intent of user actually wanting to open the door so that the biometrics match can be used. This is a relatively easy problem to solve for a contact biometric like fingerprint but for face recognition or iris scanning there is a need for a more precise method to control the trigger distance. In some embodiments, the proposal is to use the face size (e.g., pixels between eyes) or the real distance (e.g., distance to the camera) which can be estimated from the face images in the camera video stream. A more advanced approach is to detect intent from the face size increase rate or the face approaching velocity which also can be estimated from the face images. By doing so, it is possible to differentiate still users from users actually approaching (e.g., moving toward) the door. Lastly the credential position could also be used for intent detection. In its simplest form by checking the RSSI level or the RSSI increase rate.

Consequentially, the reader can unlock or open the door automatically without requiring the user to physically present their access control credential directly to the reader and without requiring the user to make any cumbersome type of gesture or interaction with the reader.

In some embodiments, the overall security of the system can be increased by scrambling the access control IDs stored by or made accessible to the reader. Furthermore, in some embodiments, the access control credential being carried by the user may have that user's biometric template (e.g., a face template for that user) stored in memory of the access control credential. Thus, as the user approaches the reader and the access control credential comes within a read range of the reader, the access control credential can wirelessly transmit the biometric template to the reader. The reader can then use the template for comparison against the biometric information obtained for the user approaching the reader. The biometric template may optionally then be bound to the access control ID for the user if a positive match is found between the biometric template and the biometric information obtained for the user by the reader. This information may be stored in cache memory of the reader for a predetermined amount of time (e.g., one hour, one day, one week, one minute, etc.) to enable the reader to more quickly admit entry for that user on subsequent uses of the reader/door.

In some embodiments, the user experience with the system disclosed herein may be separated into different phases: (1) enrollment; (2) first time use; and (3) subsequent use. In enrollment, the biometric template for the user is created and embedded in the access control credential. Specifically, as a non-limiting example, an image of the user's face may be captured at an enrollment station (e.g., a front desk or with some security personnel). The image (or potentially multiple images) may then be converted into a facial template that is wrapped/secured with a layer of encryption. This secured facial template may then be issued and stored on an appropriate access control credential.

When the user approaches a reader for the first time, the reader will likely not have any prior knowledge of the user's biometric information. Accordingly, as the user moves within a read range of a reader (e.g., up to 100 m or more for BLE), then an authentication process may be initiated between the reader and the user's access control credential. The authentication process may be as simple as each device (reader and access control credential) confirming that the other device is utilizing an appropriate protocol and/or that an appropriate secret has been shared between the devices. After the devices have authenticated, the user's facial template may be transferred to the reader where it is stored in the reader's template database (if the template is not already present in template database) before the user reaches the door. At a transfer rate of only 1 kByte/s in the worst case scenario with some mobile phones, a read range of 10 m and walking would give the reader approximately 7 seconds to exchange the necessary data including the facial template. In some embodiments, the facial template may be about 2 kByte in size, so the transfer can be made in a sufficient amount of time before the user reaches the door (e.g., with 5 seconds to spare). Once the facial template is stored at the readers template database (on or accessible to the reader), the reader can obtain facial information for the user from a camera that is mounted on or near the reader (or on or near the door). This facial information can be compared against the facial template and if a match is determined, then the door may be opened. The facial template may be maintained in the reader's cache memory for subsequent uses (to improve usability and accuracy).

During subsequent uses, the user will approach the reader/door in a manner similar to the first use case scenario. When the user and their access control credential are within a read range of the reader, the reader will obtain an access control ID from the access control credential (this may be transferred to the reader in the absence of the facial template if the reader and/or access control credential know this use of the door corresponds to a subsequent use). The reader verifies the access control ID obtained from the access control credential (e.g., to confirm that the ID format is acceptable and/or that the ID corresponds to a known and valid access control ID). The access control ID is then used to look up a corresponding facial template from the template database (stored on the reader or in memory made accessible to the reader) for biometric matching. The reader then obtains image information from a camera mounted on or near the reader (or on or near the door) and the biometric matching process is completed. If the biometric matching process indicates that the biometric information matches the template (at least within an acceptable tolerance), then the reader opens the door, unlocks a lock, or otherwise enables the user to automatically pass through the physical access point. As can be seen, the reader does not necessarily have to obtain the facial template from the access control credential in subsequent uses, which significantly increases the speed with which a user can be identified. Moreover, since the access control ID is used to reduce the number of facial templates that have to be searched (e.g., by identifying a corresponding one or smaller subset of the total facial templates in the template database), the reader is able to reduce the overall number of facial templates that have to be analyzed/searched. This increases processing speed and can improve the overall user experience.

In some embodiments, potential complications associated with having many users within a read range of a reader can be addressed by applying additional intelligence at the reader. For instance, the reader may analyze which access control credentials are having their respective signals increase in strength. More specifically, the reader may analyze which RSSI signals are increasing in strength by applying a derivative to the RSSI function over time. While increases in RSSI may not be easy to detect for all access control credentials within read range of the reader, the application of this type of filter can help remove at least some access control credentials from the set of access control credentials that are considered to be approaching the reader (e.g., showing an intent to enter the door protected by the reader).

In some embodiments, the reader may include a directional antenna (or multiple antennae) that can narrow the read range to a specific area of interest that more closely aligns with a passage in front of a door. As a non-limiting example, a directional antenna could probably reduce the read range (and consequential trigger area for automatically opening/unlocking the door) to approximately 5 m in front of the door and 1 m in back (e.g., on the secure side) of the door.

In some embodiments, one or more motion sensors may be coupled to access control credentials and inputs from those motion sensor could be used to filter out still (e.g., non-moving) credentials. More specifically, if no or little motion is detected at the access control credential, then the access control credential may not advertise its access control ID to the reader or if the access control ID is transmitted, the reader may know to discard the access control IDs that come with additional information indicating that the access control credential is not moving in a significant way.

In some embodiments, analytics may be used to associate access control credentials and faces. For instance, the reader may create a correlation between face size/position, RSSI, and/or credential motion (e.g., via motion sensors). The reader may then utilize some form of Artificial Intelligence to associate access control credentials with faces/bodies and further detect a user that is exhibiting an intent to open the door (e.g., by detecting the user is moving toward the door in a certain manner and is carrying a moving access control credential). It should be appreciated that this Artificial Intelligence may be executed within the reader and/or in the access control credential if it has sufficient memory and processing capabilities (e.g., as a smartphone would).

In some embodiments, real indoor positioning of credential could be used to associate with faces detected in a video camera. Specifically, RSSI trilateration could be done with several anchors.

In some embodiments, additional directional antennas outside the reader housing could be deployed around the door area. As an example, dual directional antennas could be placed on an outward-facing side of a door to filter out access control credentials on the opposite side of the door. It could also be possible to install two directional antennas— one on the opposing side of the door from the other to help further identify whether an access control credential is on the inside or outside of the door. Similarly, camera position could be manipulated to help control the number of faces that are detected and processed at a given time. The camera could be placed directly on the reader housing or above the door facing downward such that a limiting viewing angle is created for the camera.

In some embodiments, in addition to or in lieu of using just RSSI, other signal characteristics can be used to filter out access control ID or detect a user's intent for entering a door. As an example, Angle of Arrival (AoA), Time-of-Flight (ToF), signal decay, and other characteristics could be used along with or in lieu of RSSI.

The term "computer-readable medium," as used herein, refers to any tangible data storage medium that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read instructions. When the computer-readable medium is configured as part of a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

As used herein, "credential information" is any data, set of data, encryption scheme, key, and/or transmission protocol used by a particular device (e.g., a "credential device") to authenticate and/or verify its authenticity with a reader, and/or interrogator.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together. When each one of A, B, and C in the above expressions refers to an element, such as X, Y, and Z, or class of elements, such as $X_1$-$X_n$, $Y_1$-$Y_m$, and $Z_1$-$Z_o$, the phrase is intended to refer to a single element selected from X, Y, and Z, a combination of elements selected from the same class (e.g., $X_1$ and $X_2$) as well as a combination of elements selected from two or more classes (e.g., $Y_1$ and $Z_0$).

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The terms "determine," "calculate," and "compute," and variations thereof, as used herein, are used interchangeably and include any type of methodology, process, mathematical operation, or technique.

The term "means" as used herein shall be given its broadest possible interpretation in accordance with 35 U.S.C., Section 112(f). Accordingly, a claim incorporating the term "means" shall cover all structures, materials, or acts set forth herein, and all of the equivalents thereof. Further, the structures, materials or acts and the equivalents thereof shall include all those described in the summary of the invention, brief description of the drawings, detailed description, abstract, and claims themselves.

The term "module" as used herein refers to any known or later developed hardware, software, firmware, artificial intelligence, fuzzy logic, or combination of hardware and software that is capable of performing the functionality associated with that element.

It should be understood that every maximum numerical limitation given throughout this disclosure is deemed to include each and every lower numerical limitation as an alternative, as if such lower numerical limitations were expressly written herein. Every minimum numerical limitation given throughout this disclosure is deemed to include each and every higher numerical limitation as an alternative, as if such higher numerical limitations were expressly written herein. Every numerical range given throughout this disclosure is deemed to include each and every narrower numerical range that falls within such broader numerical range, as if such narrower numerical ranges were all expressly written herein.

The preceding is a simplified summary of the disclosure to provide an understanding of some aspects of the disclosure. This summary is neither an extensive nor exhaustive overview of the disclosure and its various aspects, embodiments, and configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and configurations of the disclosure are possible utilizing, alone or in combination, one or more of the features set forth above or described in detail below.

BRIEF DESCRIPTION OF THE DRAWINGS

The accompanying drawings are incorporated into and form a part of the specification to illustrate several examples of the present disclosure. These drawings, together with the description, explain the principles of the disclosure. The drawings simply illustrate examples of how the disclosure can be made and used and are not to be construed as limiting the disclosure to only the illustrated and described examples. Further features and advantages will become apparent from the following, more detailed, description of the various aspects, embodiments, and configurations of the disclosure, as illustrated by the drawings referenced below.

FIGS. 6A-6D depict a user approaching a door or portal during a first use-case scenario in accordance with embodiments of the present disclosure;

FIGS. 7A-7D depict a user approaching a door or portal during a second use-case scenario in accordance with embodiments of the present disclosure;

DETAILED DESCRIPTION

Copyright and Legal Notices

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyrights whatsoever.

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

Figure 1:
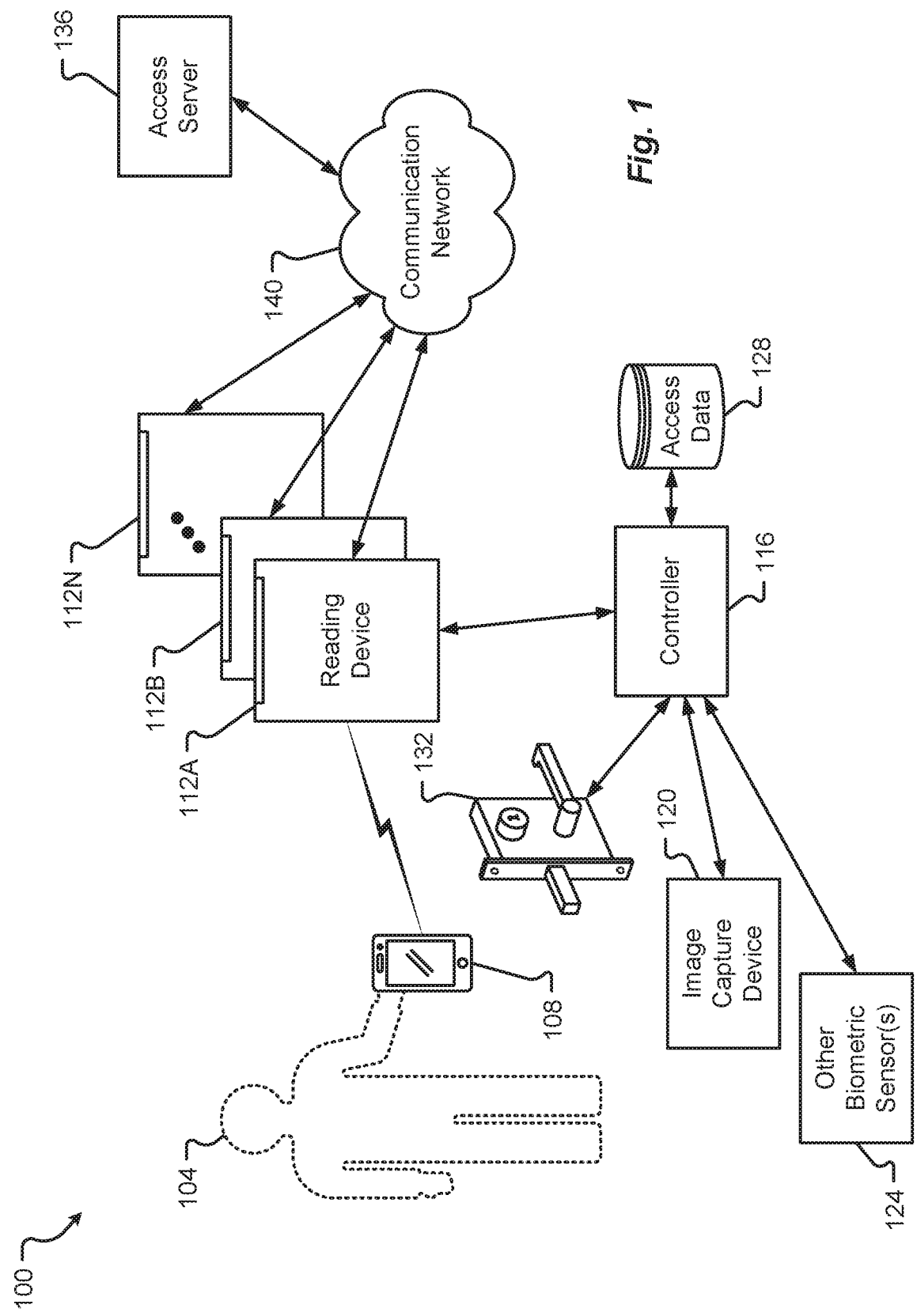
FIG. 1 is a diagram depicting an access control system in accordance with embodiments of the present disclosure.

FIG. 1 is a diagram depicting an access control system 100 in accordance with embodiments of the present disclosure. In one embodiment, the access control system 100 comprises at least one reading device 112 and at least one portable device 108. The portable device 108 may also be referred to herein as a credential device, user device, mobile device, mobile communication device, mobile phone, or the like. The reading device 112 may include (e.g., in local memory) or have access to access data 128. The access data 128 may be stored in a database, a table, as a rule set, as program instructions, and/or as other data associated with maintaining security of an access control system 100. In some embodiments, the reading device 112 may be configured to communicate with the access data 128 across a communication network 140, through a controller 116 (as shown), or directly. In other words, the access data 128 may be located remotely, locally, and/or locally and remotely, from the reading device 112.

The portable device 108 may be configured to communicate with a reading device 112 across one or more wireless communication connections. These one or more wireless communication connections can leverage communications via at least one of conventional radio protocols, proximity-based wireless communication protocols, Bluetooth™, BLE, infrared, audible, NFC, RF, and other wireless communication networks and/or protocols. In some cases, communications between the portable device 108 and the reading device 112 may be established automatically when the portable device 108 enters an active zone of an interrogating reading device 112. In one embodiment, the active zone of the reading device 112 may be defined as a three-dimensional space where the intensity of RF signals emitted by the reading device 112 exceeds a threshold of sensitivity of the portable device 108 and the intensity of RF signals emitted by the portable device 108 exceeds a threshold of sensitivity of the reading device 112.

In some embodiments, the portable device 108 may be configured to communicate with a reading device 112 across a communication network 140, although such a configuration is not depicted in the example of FIG. 1. In such embodiments, the communication network could include at least one of conventional radio networks, wireless communication networks, Zig-Bee, GSM, CDMA, WiFi, and/or using other communication networks and/or protocols as provided herein.

In one embodiment, authentication may be required between the portable device 108 and the reading device 112 before further communications are enabled. The further communications may provide communications in which access control information (e.g., keys, templates, codes, credentials, etc.) are shared. In some embodiments, the authentication may be provided via one-way or mutual authentication. Examples of authentication may include, but are not limited to, simple authentication based on site codes, trusted data formats, shared secrets, and/or the like. As can be appreciated, access control information is more sensitive and may require more involved validation via, for example, an encrypted exchange of access control information.

In some embodiments, the reading device 112 may be configured to request access control information and/or biometric templates from the portable device 108. The access control information and/or biometric template may be provided by the portable device 108 to the reading device 112 via the wireless connection established therebetween.

The reading device 112, or components connected thereto (e.g., the controller 116), may utilize the access control information and/or biometric templates to determine whether a user 104 is allowed admittance to a controlled area of a physical premises. In particular, information obtained from the portable device 108 along with information obtained from an image capture device 120 or other biometric sensor(s) 124 may be compared to access data 128 and/or biometric template(s) to determine if a door actuator or lock 132 should be opened, thereby admitting the user 104 passage to a protected physical asset. As will be discussed in further detail herein, the decision to allow user 104 access may be made at the reading device 112, at the controller 116, at a remote access server 136, or a combination thereof.

Typically, a reading device 112 is associated with a particular asset (e.g., a door protecting access to a secure room, a computer lock protecting sensitive information or computer files, a lock on a safe, and the like). In one embodiment, the portable device 108 and the holder of the portable device 108 (e.g., the user 104) may be validated via one or more components of the access control system 100. Once the portable device 108 is authenticated, credential information, biometric information for the user 104, and other information may be validated. During this process, the reading device 112 or controller 116 may generate signals facilitating execution of the results of interrogating the portable device 108 (e.g., engages/disengages a locking mechanism, allows/disallows movement of a monitored article, temporarily disables itself, activates an alarm system, provides access to a computer system, provides access to a particular document, and the like). Alternatively, the access server 136 may generate such signals.

In accordance with embodiments of the present disclosure, the reading device 112 may collect access control information associated with the portable device 108 before an access control decision can be made. For example, the reading device 112 may require credential information stored on the portable device 108 to validate the portable device 108. In addition to validating the information received from the portable device 108, the reading device 112 and/or controller 116 may compare information from the image capture device 120 and/or other biometric sensor(s) 124 with one or more biometric templates. The information obtained from the image capture device 120 and/or biometric sensor(s) 124 may describe current biometric information about the user 104. If the current biometric information about the user 104 substantially matches information in a biometric template within an acceptable threshold, then the user 104 may be identified as a valid or trusted user. In some embodiments, when both the user 104 and portable device 108 are validated, the reading device 112 and/or controller 116 may actuate the door actuator or lock 132. In some embodiments, information from the portable device 108 may be used to reduce the number of biometric templates that are compared against the user's 104 current biometric information (e.g., information from devices 120, 124), thereby enabling the biometric comparison to occur more quickly than if all biometric templates were analyzed. By increasing the speed with which a biometric comparison is performed, the overall validation process for the user 104 can be completed more quickly. This effectively enables the access control system 100 to make an access control decision for the user 104 quick enough to limit the amount of interaction the user 104 has to perform with their portable device 108 and/or the reading device 112. It should be appreciated that the biometric templates discussed herein can include one or more of the following template types: retina templates, infrared signature templates, weight templates, iris templates, sclera templates, body shape templates, and gait templates.

The access server 136 may include a processor, a memory, and one or more inputs/outputs. The memory of the access server 136 may be used in connection with the execution of application programming or instructions by the processor, and for the temporary or long term storage of program instructions and/or data. As examples, the memory may comprise RAM, DRAM, SDRAM, or other solid state memory. Additionally or alternatively, the access server 136 may communicate with an access data 128. Like the memory of the access server 136, the access data 128 may be stored in one or more computer memory devices that include, without limitation, solid state memory devices. Alternatively or additionally, the access data 128 may be stored in a hard disk drive or some other random access memory device.

In some embodiments, the reading device 112 may be configured to communicate with one or more devices across a communication network 140. For example, the reading device 112 may communicate with access server 136 across the communication network 140. Among other things, this communication can allow for back-end authentication and/or provide notifications from the reading device 112 to the access server 136. The communication network 140 may comprise any type of known communication medium or collection of communication media and may use any type of protocols to transport messages between endpoints. The communication network 140 may include wired and/or wireless communication technologies. The Internet is an example of the communication network 140 that constitutes an Internet Protocol (IP) network consisting of many computers, computing networks, and other communication devices located all over the world, which are connected through many telephone systems and other means. Other examples of the communication network 140 include, without limitation, a standard Plain Old Telephone System (POTS), an Integrated Services Digital Network (ISDN), the Public Switched Telephone Network (PSTN), a Local Area Network (LAN), a Wide Area Network (WAN), a Session Initiation Protocol (SIP) network, a Voice over Internet Protocol (VoIP) network, a cellular network, RS-232, similar networks used in access control systems between readers and control panels, and any other type of packet-switched or circuit-switched network known in the art. In addition, it can be appreciated that the communication network 140 need not be limited to any one network type, and instead may be comprised of a number of different networks and/or network types. Moreover, the communication network 140 may comprise a number of different communication media such as coaxial cable, copper cable/wire, fiber-optic cable, antennas for transmitting/receiving wireless messages, and combinations thereof.

Figure 2:
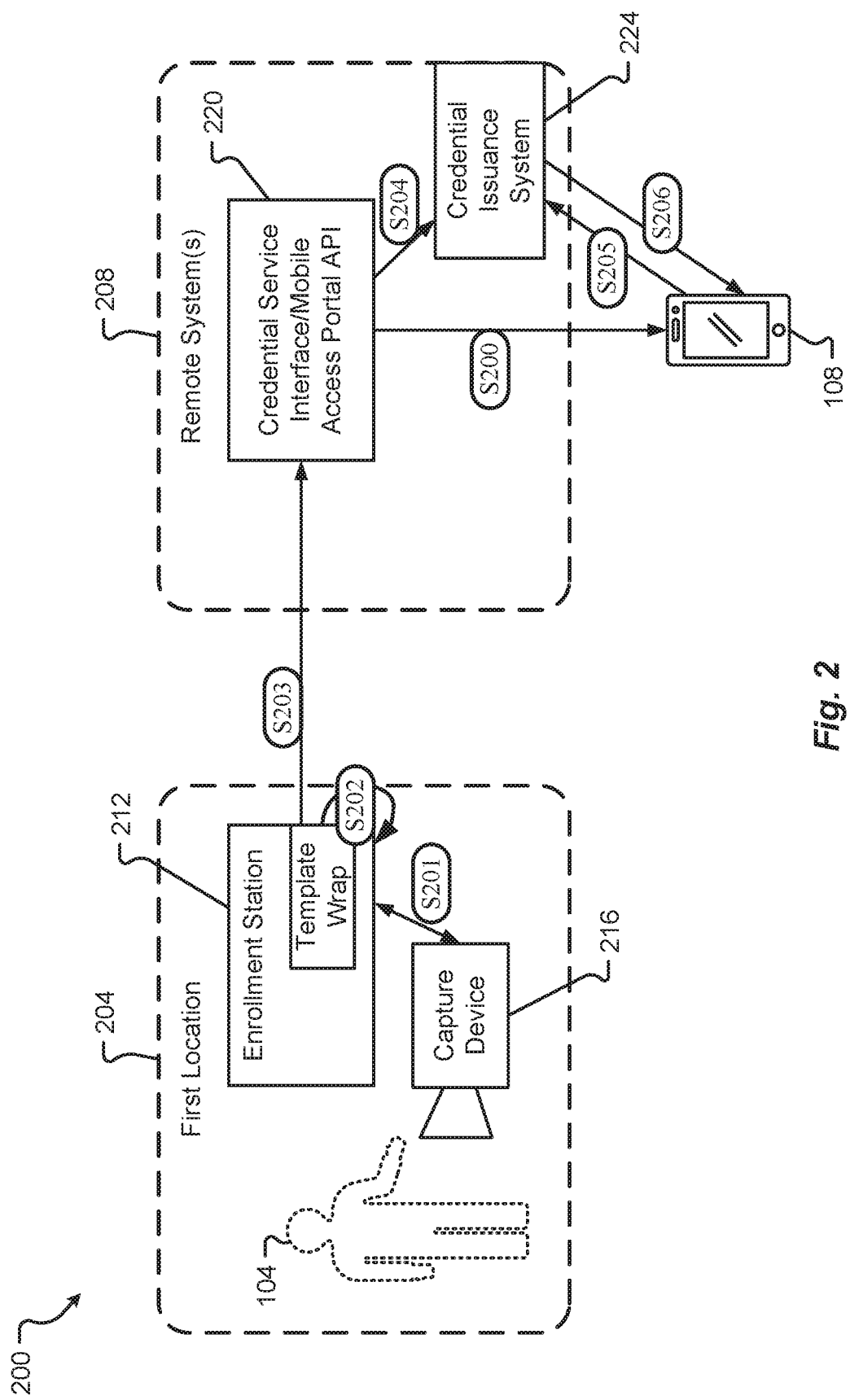
FIG. 2 is a diagram depicting additional details of an access control system and its operation in accordance with embodiments of the present disclosure.

Referring now to FIG. 2, additional details of an access control system 200 and its operation will be described in accordance with at least some embodiments of the present disclosure. The access control system 200 is shown to include similar or identical components to those included in access control system 100. It should be appreciated that similar devices in each system may have similar or identical characteristics and/or features. The access control system 200 is shown to have a number of components operating at a first location 204 and another number of components operating at a second location 208 that is remote from the first location. In some embodiments, the first location 204 and second location 208 may be in communication with one another (e.g., connected to one another) via a communication network 140 or the like.

The first location 204 is shown to include an enrollment station 212 and a capture device 216. The capture device 216 may be an example of an image capture device 120. For instance, the capture device 216 may correspond to a still image capture device or video capture device. Alternatively or additionally, the capture device 216 may include one or more biometric sensor(s) 124 or similar types of biometric capture devices. As some non-limiting examples, the capture device 216 may include a fingerprint capture device, a retina image capture device, a heartbeat/heartrate capture device, or any other type of device capable of capturing biometric information about a user.

The enrollment station 212 is shown to include a template wrap module. The template wrap module of the enrollment station 212 may be executed by a processor in the enrollment station to facilitate the creation and packaging of a biometric template with information obtained from the capture device 216. In some embodiments, the enrollment station 212 includes a microprocessor and computer memory that enable execution of the template wrap. The enrollment station 212 may be operated by security administration personnel or the enrollment station 212 may include functions that enable the user 104 to complete a self-enrollment procedure where the user 104 is allowed to enroll themselves in the physical access control system and generate their own biometric template(s).

The enrollment station 212 is shown to be in communication with a credential service interface or mobile access portal Application Programming Interface (API) 220. As noted above, the communication between the enrollment station 212 and mobile access portal API 220 may be facilitated by a communication network 140. The connection may or may not be an encrypted/secure connection, depending upon the security requirements of the system and whether or not the template wrap is encrypted prior to being transmitted. The mobile access portal API 220 may enable the enrollment station 212 to communicate with a credential issuance system 224 in a secure manner. The mobile access portal API 220 may also facilitate the delivery of one or more biometric templates to a portable device 108. The delivery of biometric templates to the portable device 108 may be performed directly through the mobile access portal API 220 or the biometric template(s) may be delivered via the credential issuance system 224. In some embodiments, the credential issuance system 224 is provided as one or more servers that operate in a secured environment (e.g., behind one or more firewalls and/or Session Border Controllers (SBCs)). In some embodiments, the entire remote system 208 operates in a secured environment. The mobile access portal API 220 may be provided as a functional component of the server that also implements the credential issuance system 224. Communications between the remote system 208 and the portable device 108 may occur via a communication network 140, which may be the same or a different type of communication network that is used to carry communications between the first location 204 and the remote system 208.

The access control system 200 may be used to facilitate the enrollment of a user 104 in the larger access control system 100. In operation, the user-enrollment process may begin with the remote system 208 sending a registration communication to the user's 104 portable device 108 (step S200). In some embodiments, the mobile access portal API 220 generates and sends a message to the portable device 108 of the user 104. The message may be in the form of an email message, an SMS message, an MMS message, an HTML file, or the like. It should be appreciated that this step may be performed after other steps in the enrollment process.

Enrollment may also include using the capture device 216 to capture one or more images or other biometric indicators of the user 104. The capture information may be provided to the enrollment station 212 via a wired or wireless connection (step S201). In some embodiments, the capture device 216 corresponds to a dedicated image capture device that is connected to the enrollment station 212, which may be in the form of a personal computer, laptop, or the like. In an alternative embodiment, the capture device 216 may correspond to an image capture component on the user's 104 portable device 108. For instance, the user 104 may be enabled to complete a self-enrollment by taking an image or multiple images of herself using a camera function on the portable device 108. The captured information may be provided to the enrollment station 212 in a secured or unsecured manner, depending upon system requirements and user preferences.

Upon receiving the information from the capture device 216, the enrollment station 212 may utilize its template wrap module to create one or more biometric templates for the user 104 (step S202). It should be appreciated that the one or more biometric templates may include facial templates, fingerprint templates, full-body templates, ear templates, retina templates, etc. As is known in the art, biometric templates are not copies of the captured biometric information (e.g., a biometric template is not simply an image of user 104). Rather, the biometric templates generated with the template wrap are results from some kind of analysis and summary of the captured biometric information. As a non-limiting example, the biometric template(s) may correspond to an analysis of the locations of minutia contained in fingerprints or facial images. As another example, the biometric template(s) may correspond to a mathematical summary of the patterns in an iris image, facial image, or the like. These templates contain the unique characteristics of user's 104 biometric information, and they are the master copies to which future data acquisitions can be compared.

The enrollment process continues with the enrollment station 212 sending the wrapped biometric template(s) to the credential service interface 220 (step S203). Specifically, this data may be transmitted to the remote system 208 with a request for the credential issuance system 224 to provision an appropriate biometric template consistent with data and formatting requirements of the access control system 100, 200.

The credential service interface 220 may then forward the biometric template (or the request for the biometric template) to the credential issuance system 224 (step S204). In response, the credential issuance system 224 may generate an appropriate message or data payload that is deliverable to the portable device 108. The message or data payload may include the biometric template(s) generated at the enrollment station 212. In some embodiments, the credential issuance system 224 may hold the biometric template until the portable device 108 submits a request for the biometric template (step S205). By waiting for an appropriate request from the portable device 108, the credential issuance system 224 ensures that biometric templates are not inappropriately transmitted to unverified portable devices 108. As a non-limiting example, the request generated and transmitted by the portable device 108 may be generated with information contained in the registration message received at step S200.

Thus, the request transmitted in step S205 makes reference to the registration message or obtains addressing information for the credential issuance system 224 via the registration message.

Upon receiving the request, the credential issuance system 224 may reference its internal database to determine if a biometric template has been created for a user 104 associated with the portable device 108. If such a biometric template has been generated and received at the credential issuance system 224, the system 224 may then transmit the biometric template(s) to the portable device 108 (step S206). This effectively enables the portable device 108 to store and retain the biometric template(s) in local memory. As an example, the portable device 108 may store the biometric template(s) in a secured or encryption-protected area of memory. Alternatively or additionally, the biometric template(s) may be stored by a particular application operating on the portable device 108, thereby making the biometric template(s) inaccessible to other applications on the portable device 108. At this point, the portable device 108 is now provisioned with a biometric template and the user 104 is ready to make use of the access control system 100 in a relatively frictionless manner as will be described in further detail herein.

Figure 3:
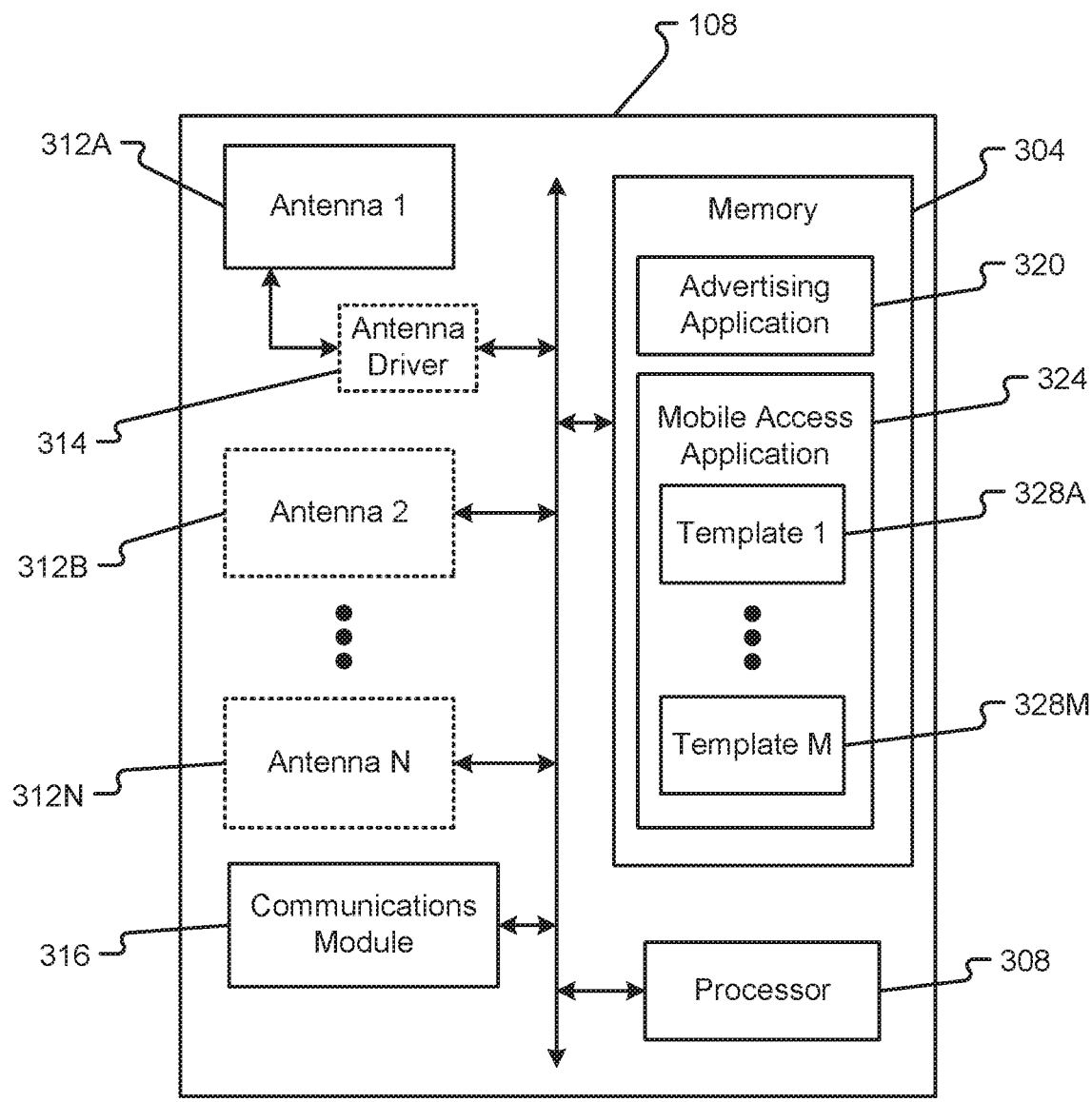
FIG. 3 is a block diagram depicting details of an access credential in accordance with embodiments of the present disclosure.

With reference now to FIG. 3, additional details of a portable device 108 will be described in accordance with at least some embodiments of the present disclosure. As mentioned above, a portable device 108 may correspond to any type of communication or computing device capable of being carried by user 104. A portable device 108 may include a smartphone, a tablet, a laptop, an implanted microchip, etc.

The portable device 108 may include one or more components, such as, a memory 304, a processor 308, an antenna 312A-N, and a communications module 316. The memory 304 of the portable device 108 may be used in connection with the execution of application programming or instructions by the processor 308, and for the temporary or long term storage of program instructions and/or data. The memory 304 may also be used for the long term or temporary storage of template(s) 328A-M. The memory 304 may further contain executable functions that are used by the processor 308 to run other components of the portable device 108. In one embodiment, the memory 304 may be configured to store credential information, templates, as well as applications that enable the portable device 108 to be used and recognized within the access control system 100. In some embodiments, the memory 304 may comprise volatile or non-volatile memory and a controller for the same. Non-limiting examples of memory 304 that may be utilized in the portable device 108 include RAM, ROM, buffer memory, flash memory, solid-state memory, or variants thereof.

The processor 308 may correspond to one or many microprocessors that are contained within the housing of the portable device 108 with the memory 304. In some embodiments, the processor 308 incorporates the functions of the user device's Central Processing Unit (CPU) on a single Integrated Circuit (IC) or a few IC chips. The processor 308 may be a multipurpose, programmable device that accepts digital data as input, processes the digital data according to instructions stored in its internal memory, and provides results as output. The processor 308 implements sequential digital logic as it has internal memory. As with most known microprocessors, the processor 308 may operate on numbers and symbols represented in the binary numeral system.

The one or more antennas 312A-N may be configured to enable wireless communications between the portable device 108 and a reading device 112 and/or between the portable device 108 and a communication network 140. As can be appreciated, the antenna(s) 312A-N may be arranged to operate using one or more wireless communication protocols and operating frequencies including, but not limited to, Bluetooth®, NFC, Zig-Bee, GSM, CDMA, WiFi, RF, and the like. By way of example, the antenna(s) 312A-N may be RF antenna(s), and as such, may transmit RF signals through free-space to be received by a reading device 112 having an RF transceiver.

In some embodiments, the portable device 108 may include a power module. The power module may be configured to provide power to the parts of the portable device 108 in order to operate. The power module may store power in a capacitor of the power module. In one embodiment, electronics in the power module may store energy in the capacitor and turn off when an RF field is present. This arrangement can ensure that energy is presented to the portable device 108 minimizing any effect on read distance. Although the portable device 108 may be configured to receive power passively from an electrical field of a reading device 112, it should be appreciated that the portable device 108 may provide its own power. For example, the power module may include a battery or other power source to supply power to parts of the portable device 108. The power module may include a built-in power supply (e.g., battery) and/or a power converter that facilitates the conversion of externally-supplied AC power into DC power that is used to power the various components of the portable device 108. In some embodiments, the power module may also include some implementation of surge protection circuitry to protect the components of the portable device 108 from power surges.

The portable device 108 may include a communications module 316 that is configured to communicate with one or more different systems or devices either remotely or locally. Thus, the communications module 316 can send or receive messages to or from reading devices 112, servers 136, across the communication network 140, etc. The communication module 316 may leverage one or more antenna drivers 314 to format messages for transmission by an antenna 312A. Conversely, an antenna driver 314 may also be used to transform signals received at an antenna 312A into appropriate messages that are useable by the communication module 316 and then transferrable to the processor 308.

The memory 304 of the portable device 108 is specifically shown to have an advertising application 320 and one or more mobile access applications 324 stored thereon. The advertising application 320 may contain instructions that, when executed by the processor 308, enable the portable device 108 to advertise or broadcast certain information about the portable device 108 (e.g., a mobile identifier, a model type, an identification of mobile access application 324, a Bluetooth or BLE beacon ID, a random number, a site code, a serial number, etc.). Generally speaking, the information transmitted by the advertising application 320 is not considered sensitive. Thus, the information transmitted by the advertising application 320 may be transmitted in the clear and, as an example, may be used to facilitate an initial authentication between the portable device 108 and the reader 112.

The mobile access application 324, in comparison, may store sensitive mobile access credentials and/or biometric templates 328A-M. The biometric templates 328A-M stored in the mobile access application 324 may be similar or identical to the biometric templates that were generated during the enrollment process depicted and described in connection with FIG. 2. As can be appreciated, the different biometric templates stored in a single mobile access application 324 may include templates of different types (e.g., facial templates, fingerprint templates, retina templates, gait templates, etc.). In some embodiments, more than one mobile access application 324 may be stored in memory 304. In such a situation, different mobile access applications 324 may be used in connection with different access control systems 100. As a non-limiting example, one mobile access application 324 may be used in connection with user's 104 home access control system whereas another mobile access application 324 may be used in connection with user's 104 work access control system. These different applications 324 may be isolated from one another in memory 304, meaning that information is not shared between the applications. A scenario may exist, however, where a user 104 allows a single biometric template to be stored in two or more different mobile access applications 324 that operate in connection with different access control systems. This may be possible if there is a certain level of trust between the applications 324, meaning that one application can prove to the other application that a biometric template created for the one application is trusted and suitable for use with the other application. The sharing of biometric templates 328 between mobile access applications 324 may help reduce the number of times a user 104 is required to complete the enrollment process, which may be viewed as cumbersome and time-consuming.

Figure 4A:
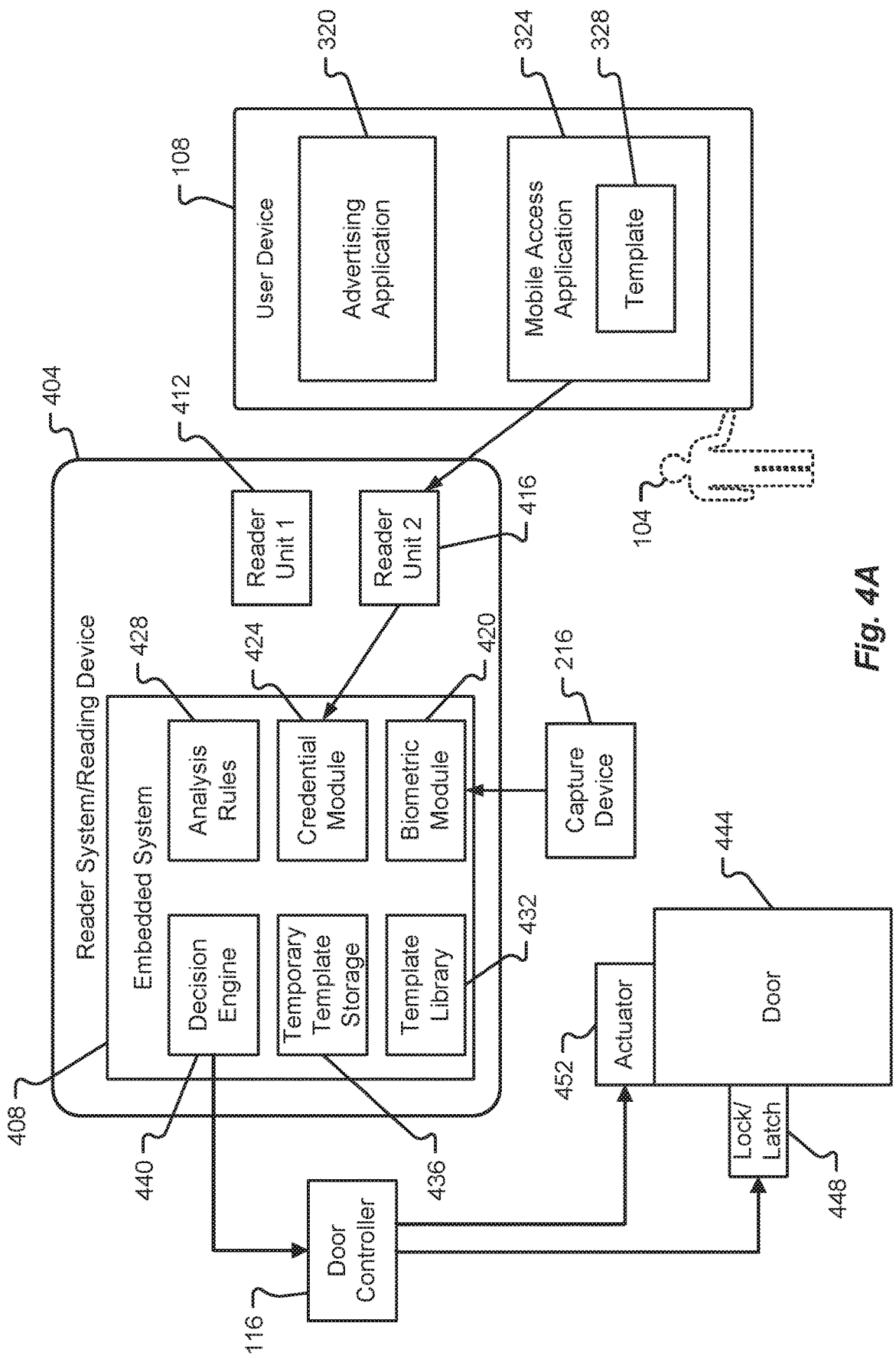
FIG. 4A is a block diagram depicting additional details of an access control system in which a reader interacts and receives a biometric template during a first instance in accordance with embodiments of the present disclosure.
Figure 4B:
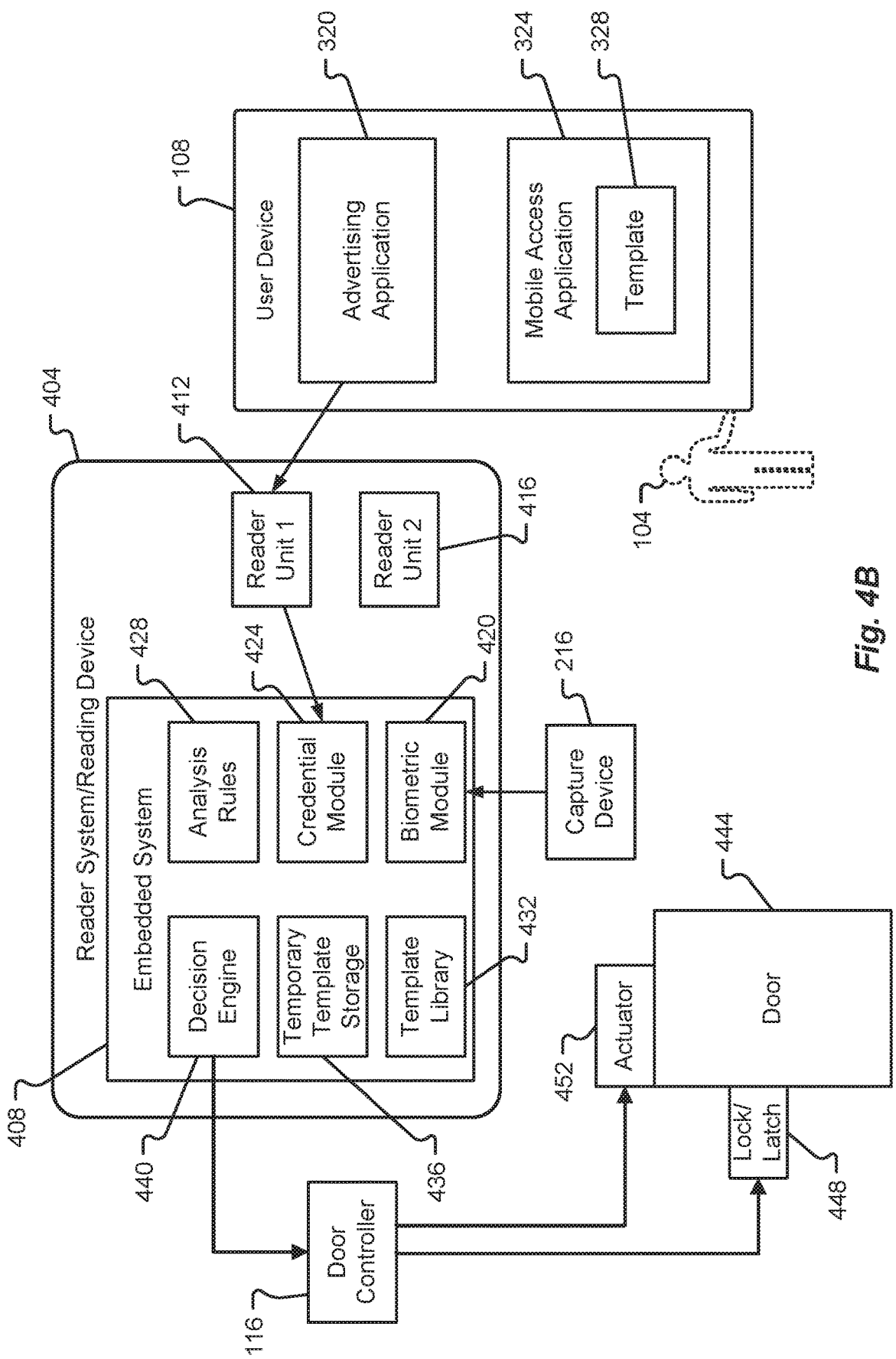
FIG. 4B is a block diagram depicting the access control system of FIG. 4A during a second interaction between a reader and user device in accordance with embodiments of the present disclosure.

With reference now to FIGS. 4A and 4B, additional details of a portable device 108 interacting with a reader system 404 (e.g., a reading device 112) will be described in accordance with at least some embodiments of the present disclosure. The portable device 108 is now depicted as a user device 108, but it should be appreciated that the devices are similar or identical to one another. The term user device 108 is intended to denote that the portable device is being carried by a particular user 104. Referring initially to FIG. 4A, a first use scenario will be described.

In this particular scenario, a user 104 approaches a reader system 404 with their user device 108 for a first time. As can be appreciated, the reader system 404 may correspond to a particular example of a reading device 112 or a collection of reading devices 112. Alternatively or additionally, a reader system may vary from a reading device in that the reader system does not necessarily contain all of its components in a common housing whereas a reading device contains all of its components in a common housing. For ease of discussion, FIGS. 4A and 4B may reference to a reader system 404, but it should be appreciated that a reading device 112 may operate in a similar or identical fashion to the reader system 404.

The reader system 404 is shown to include an embedded system 408 that is in communication with one or more reader units 412, 416. The reader units 412, 416 may serve as the physical interface between the embedded system 408 and the user device 108. During first use, the reader system 404 may not have the biometric template 328 for user 104 in local memory. Thus, the biometric template 328 is communicated to the reader system 404 via reader unit 416. In some embodiments, the reader unit 416 corresponds to a second reader unit of the reader system 404 whereas reader unit 412 corresponds to a first reader unit 412. The reader units 412, 416 may utilize different communication protocols or wireless communication channels/frequencies to exchange information with the user device 108. As a non-limiting example, the first reader unit 412 may correspond to a generic BLE reader whereas the second reader unit 412 may correspond to a secured BLE reader. Other protocols (e.g., NFC) may be utilized by one or both of the reader units 412, 416.

When the reader system 404 needs to obtain a biometric template from the user device 108, it may be desirable to use a secured reader unit (e.g., the second reader unit 416) as opposed to using a less secure reader unit. This helps to ensure that the biometric template is not compromised when being transmitted to the reader system 404.

The embedded system 408 is further shown to include a biometric module 420, a credential module 424, analysis rules 428, a template library 432, a temporary template storage area 436, and a decision engine 440. The credential module 424 may interface with the reader units 412, 416 whereas the biometric module may interface with the capture device(s) 216. Each of the credential module 424 and biometric module 420 may be used in connection with making an access control decision for the user 104. Such an access control decision may account for both credential information stored on the user device 108 and/or biometric information of the user 104 that is captured by the capture device 216. Analysis rules 428 may be referenced by a decision engine 440 to make an access control decision based on the data received from both the credential module 424 and biometric module 420.

In some embodiments, when user device 108 first interact with the reader system 404, the biometric template 328 is transmitted to the embedded system 408 via the second reader unit 416. Communications between the second reader unit 416 and credential module 424 may be facilitated by a wired connection (e.g., a hardwired connection or some other secured serial communication interface). The credential module 424 may cause the biometric template 328 to be stored in the template library 432 of the reader system 404. The biometric template 328 for the user 104 may be maintained in the template library 432 indefinitely or for as long as is practicable and based on memory management policies. The biometric template 328 can then be compared against biometric information captured by the capture device 216 and communicated to the biometric module 420. If a sufficient match is found between the biometric template 328 and the biometric information, then the decision engine 440 may communicate the positive results of the biometric comparison to the door controller 116.

The door controller 116, alternatively or additionally, may execute the decision engine 440 and make reference to the analysis rules 428. In other embodiments, the decision engine 440 may make the access control decision and the door controller 116 may provide the electromechanical interface between the reader system 404 and the actuators 448, 452 for the door 444. In some embodiments, actuators 448, 452 may include a lock or latch 448 that is moveable between a first position and a second position (e.g., a locked position and unlocked position). The actuator 452, on the other hand, may correspond to an automated arm, piston, or similar mechanical actuator that physically moves the door 444 between an open and closed position. The actuators 448, 452 may be controlled in a coordinated fashion by the door controller 116 in accordance with an access control decision made at the decision engine 440. As can be appreciated, the first access control decision made by the embedded system 408 may be slightly delayed due to the need to communicate the template 328 to the reader system 404 before enabling a biometric matching process.

FIG. 4B, on the other hand, shows the same user device 108 and reader system 404 interacting during subsequent uses (e.g., after a biometric template 328 has been communicated to the reader system 404 and stored in the template library 432). The reader system 404 and user device 108 may both maintain interaction logs, thereby enabling both devices to know when they are interacting with other devices for a first time (e.g., if no previous interaction history exists for the pair of devices) or for a subsequent time (e.g., if some previous interaction history exists for the pair of devices). During subsequent uses, the user device 108 no longer needs to communicate the biometric template 328 to the reader system 404. Instead, the user device 108 can simply provide information from its advertising application 320 to the embedded system 408 via the first reader unit 412. The advertising application 320 may simply provide an identifier for the user device 108, an identifier for the instance of the mobile access application 324, and/or an identifier for the user 104. This information is provided to the credential module 424 which correlates the received information with one or a subset of templates stored in the template library 432. These correlated templates in the template library 432 are moved to the temporary template storage area 436 so that the biometric module 420 can quickly compare the biometric information from the capture device 216 against just the biometric templates in the temporary template storage area 436.

Because the number of templates in the temporary template storage area 436 is less than the total number of biometric templates stored in the template library 432, the number of comparison performed by the biometric module 420 is greatly reduced. This dramatically increases the speed with which a biometric comparison can be performed, which, in turn, increases the speed with which an access control decision can be made for the user 104. In some embodiments, if an access control decision can be made sufficiently quickly by the reader system 404, then the door 444 may be automatically locked/unlocked and/or opened/closed for the user 104 without requiring the user 104 to slow down or perform some other type of explicit interaction with the reader system 404 when approaching the door 444. It should be appreciated that after a biometric comparison has been completed and an access control decision has been made, then the biometric template(s) held in the temporary template storage area 436 may be removed or cleared from that section of memory, clearing the memory for other biometric templates to be compared with biometric information for other users.

Figure 5:
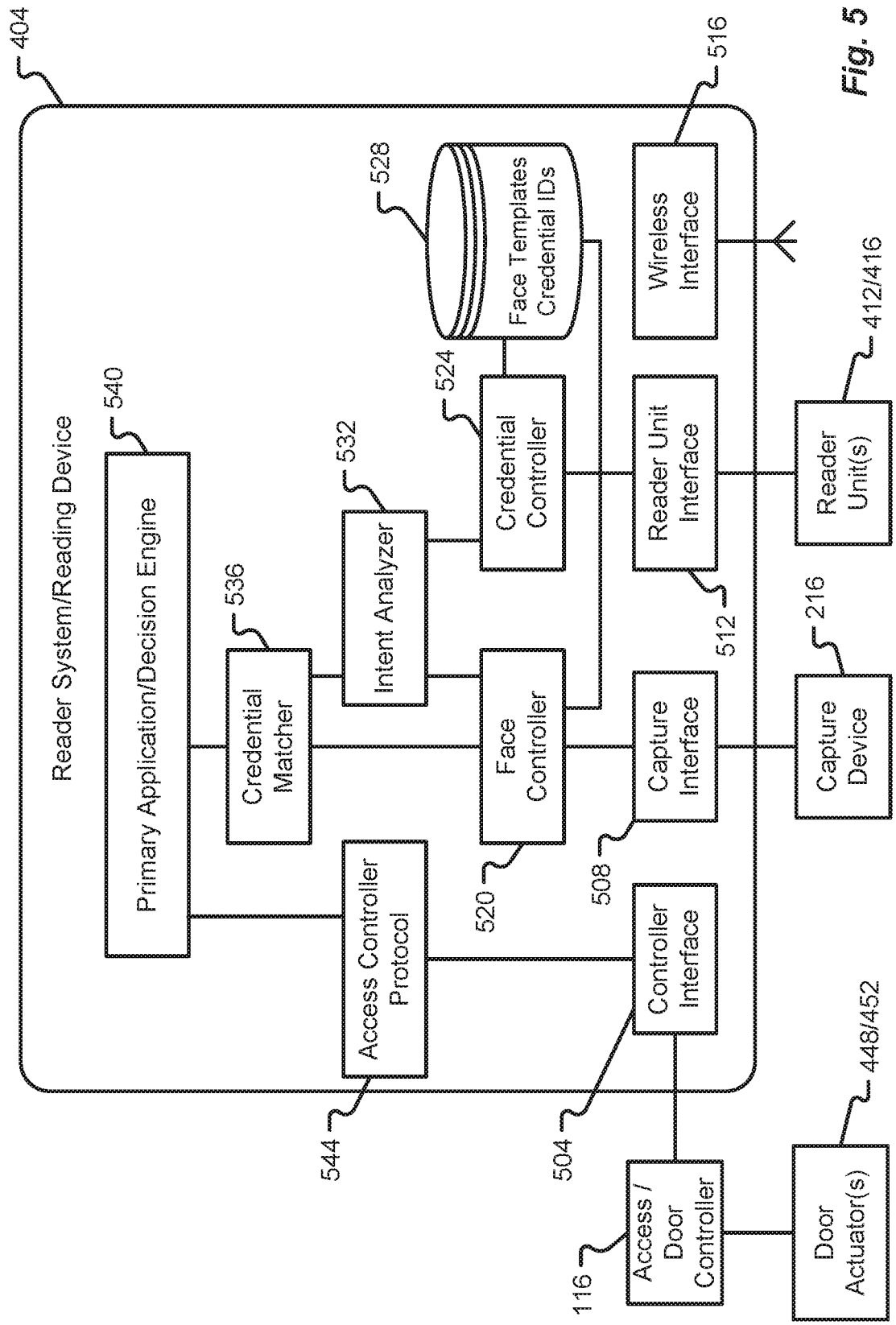
FIG. 5 is a block diagram depicting further details of a reader in accordance with embodiments of the present disclosure.

With reference now to FIG. 5 additional details of a reader system 404 will be described in accordance with at least some embodiments of the present disclosure. The reader system 404 is shown to interface with the capture device 216 as well as the reader units 412, 416 as previously described. The reader system 404 is more specifically shown to include a controller interface 504, a capture interface 508, a reader unit interface 512, a wireless interface 516, a face controller 520, a credential controller 524, a repository of facial templates and credential identifiers 528, an intent analyzer 532, a credential matcher 536, a decision engine 540, and an access controller protocol 544.

The capture interface 508 may provide a physical interface between the reader system 404 and the capture device 216. As such, the capture interface 508 may include a serial data port or some other input/output device that enables communications with the capture device 216. Non-limiting examples of a capture interface 508 include a USB port, a SCSI port, a PCIe port, an Ethernet port, a video port, or the like.

The reader unit interface 512, similar to the capture interface 508, may provide a physical interface between the reader system 404 and the reader units 412, 416. In some embodiments, a single interface 512 provides the interconnection between the reader system 404 and multipole reader units. In other embodiments, each reader unit may be connected to the reader system 404 via different and dedicated reader unit interfaces 512. The reader unit interface 512 may depend upon the nature of the reader unit 412, 416. Non-limiting examples of a reader unit interface 512 include a USB port, a collection of USB ports connected to an internal switch, an RS-232 port, an Ethernet port, etc.

The wireless interface 516 may provide a physical interface between the reader system 404 and one or more wireless antennas. The wireless interface 516 may include, without limitation, one or more wireless antenna drivers that enable communications using any type of wireless communication protocol (e.g., WiFi, Bluetooth, NFC, etc.). The wireless interface 516 may be connected directly to a processor of the reader system 404 or the wireless interface 516 may be connected directly to the primary application 540.

The capture interface 508 is connected to the face controller 520 whereas the reader unit interface 512 is connected to the credential controller 524. It should be appreciated that the face controller 520 may be embodied as any type of controller suitable for processing biometric information and templates of any type. Specifically, the face controller 520 does not have to be limited to facilitating the processing of facial biometric information and facial templates. Rather, the face controller 520 may be provided as a generic biometric controller capable of processing other types of biometric information and templates (e.g., fingerprints, retina, gait, etc.). The face controller 520 and credential controller 524 both interface with the database 528, which may include biometric templates and credential identifiers (e.g., "credential IDs"). Based on credential information received at the credential controller 524, a subset of all templates may be retrieved from the database 528 by the face controller 520. Said another way, when a credential ID is received at the credential controller 524, the credential ID may be matched to one or a subset of all templates stored in the database 528. Those matching template(s) may be provided to the face controller 520. The face controller 520 may provide the biometric information obtained from the capture interface 508 along with the retrieved template(s) to the credential matcher 536. Thus, the credential matcher 536 is allowed to compare the biometric information against less than all of the biometric templates maintained in the database 528. Alternatively or additionally, the selected biometric template(s) may not flow through the face controller 520 to the credential matcher 536. Rather, the credential controller 524 may retrieve an appropriate subset of biometric templates from the database 528 based on the lookup with a credential ID. Those templates may be provided directly to the credential matcher 536 or the subset may further be reduced to a smaller subset by an intent analyzer 532.

The intent analyzer 532 may further reduce the number of biometric templates that need to be compared against the biometric information based on a detection of which user's intent positively indicates an intent to enter the door 444. Said another way, the intent analyzer 532 may analyze the captured information from the capture device 216 to determine if particular users within a viewing area have shown a positive intent to enter the door 444. If a user's intent has been identified as positive with respect to entering the door 444, then the credential ID associated with that particular user (and not other users also within the communication range of the reader units(s) 412, 416) may be used as the credential ID to select a particular biometric template for matching at the credential matcher 536. By waiting for a positive indication of intent, the door 444 is maintained in a secure state unless and until a user 104 shows they want to pass through the door 444. This eliminates the number of times the door 444 is inadvertently opened when no user is trying to pass through the door 444, thereby enhancing the overall security of the system.

Results of the credential analysis and biometric matching may be provided from the credential matcher 536 to the primary application or decision engine 540. The primary application or decision engine 540 may then make a determination as to whether or not to actuate (e.g., open, close, lock, and/or unlock) the door 444 based on the decision from the credential matcher 536 along with any other relevant decision criteria (e.g., time of day, user access permissions, etc.).

The decision of the primary application or decision engine 540 may then be provided to the access controller protocol 544, which formats one or more instructions to be executed by the controller 116. The instructions to actuate or not actuate the door actuators 448, 452 may be provided from the controller protocol 544 to the controller 116 via the controller interface 504. In some embodiments, the controller interface 504 may include a serial or parallel data interface/port that physically connects the reader system 404 to the controller 116. Non-limiting examples of the controller interface include an RS-485 interface, a Wiegand interface, an Ethernet port, a USB port, or the like.

The controller 116 may receive the instructions from the controller protocol 544 (via the controller interface 504) and make a decision as to whether or not a door actuator 448, 452 needs to be actuated or not. As an example, if the door 444 is normally closed and a decision is made to admit a user 104 access through the door 444, then the controller 116 may cause the actuator(s) 448, 452 to unlock the lock/latch 448 as well as automatically open the door 444 via the actuator 452. Alternatively, if the door 444 is normally opened and a decision is made that a user 104 approaching the door 444 is not admitted access through the door 444, then the controller 116 may cause the actuator 452 to close the door 444 and then actuate the lock/latch 448 into a locked position. Thus, a normally opened or normally closed door 444 may be operated with the reader system 404.

With reference now to FIGS. 6A-6D, a first use-case scenario for the access control system 100 will be described in accordance with at least some embodiments of the present disclosure. FIG. 6A shows a first point in time where a user 104 is approaching a door 616 that serves as a physical portal through a wall 604 or the like. The door 616 is associated with a biometric sensor 608 as well as a reading device 612. The door 616 may be similar or identical to other doors depicted and described herein. Likewise, the biometric sensor 608 may be similar or identical to other image capture devices, biometric sensors, or capture devices depicted and described herein. The reading device 612 may be similar or identical to the reading devices or reader systems depicted and described herein.

As the user 104 approaches the door 616, the user 104 also comes into an active area for the associated biometric sensor 608 and reading device 612. In some embodiments, the user 104 may first enter an active read area 624 for the reading device 612. This active read area 624 may correspond to a volume of space in which a credential or portable device 108 carried by the user 104 is readable or capable of wirelessly exchanging information with the reading device 612. As a non-limiting example, if the reading device 612 is BLE or WiFi-enabled, then the active read area 624 may extend 10-50 meters away from the door 616. This active read area 624 may be directional (e.g., only pointed away from the door 616 on the unsecured side of the wall 604) or the active read area 624 may also extend to the secured side of the wall 604. When the user 104 is within this active read area 624, the credential or portable device 108 carried by the user 104 may perform an authentication process with the reading device 612 and further exchange credential information with the reading device 612. As a non-limiting example, the credential or portable device 108 may provide its credential ID to the reading device 612.

As shown in FIGS. 6B and 6C, if the user 104 continues to approach the door 616, the user 104 may enter a sensing range 620 for the biometric sensor 608. In embodiments where the biometric sensor 608 corresponds to a camera or image capture device, the sensing range 620 may correspond to a view range in which biometric information for the user 104 can be captured with some amount of precision and confidence. In some embodiments, credential IDs are first gathered from credentials in range (e.g., from any credential or portable device 108 found within the active read area 624). Thereafter, templates are gathered by the reader 612 using the credential IDs. Specifically, a template corresponding to the obtained credential ID is obtained from the template library. If a template is not currently stored in the template library, then the credential or portable device 108 may be asked for a template that is associated with the credential ID. Eventually, the reader 612 obtains biometric templates from the template library and a template subset is formed based on the credential IDs found within the active read area 624.

Thereafter, facial information or other biometric information for the user 104 is obtained as the user 104 enters the sensing range 620 (see e.g., FIGS. 6A and 6B). As the user 104 remains in the sensing range 620, the user 104 and his/her biometric information can be tracked, logged, etc. While the user 104 is within the sensing range 620 but prior to the user 104 entering an intent area 628, the reader 612 may compare the user's 104 biometric information against the subset of templates. If a match is found between the user's 104 current biometric information and a template analyzed from the subset of templates, then that particular user 104 will be given a "pending" access grant. In other words, a conditional access control decision is made for the user 104. This decision effectively enables the reader 612 to open the door 616 if/when the user 104 enters the intent area 628, which is a predetermined distance away from the door 616. When the user 104 eventually gets close enough to the door 616 (or camera 608), the "pending" access grant is transformed into an actual access grant as shown in FIG. 6D. At this point, the user 104 is identified as a valid user and further identified as having an intent to enter the door/portal 616.

Advantageously, the current biometric template extraction and matching can be made at a distance before user 104 is near the door 616. This biometric matching process, which is processor intensive, can be performed over a longer amount of time and prior to the user 104 positively showing an intent to enter the door/portal 616. Alternatively or additionally, it may be possible, in certain instances, to check a user's 104 access permissions (e.g., by biometric matching) after the user's 104 intent to enter the door 616 has been determined. With a CPU constrained system, however, making the biometric matching decision before the user 104 is directly in front of the door helps to enhance the user 104 experience and minimize delays of the user 104 obtaining access through the door/portal 616.

The biometric comparison can be performed relatively quickly since the reading device 612 does not have to compare the current biometric information against all templates stored in the database of the reading device 612. If a match is found between the current biometric information and the selected template, then the user 104 may be admitted access through the door 616 (either provisionally, immediately, or after the user 104 has also shown an intent to pass through the door/portal 616). If operated effectively, the user 104 may be allowed to gain access through the door 616 without having to affirmatively present their credential or portable device 108 to the reading device 612 and without having to wait or break stride while approaching the door 616 since the biometric match could be made relatively quickly and prior to the user 104 entering the intent area 628.

With reference now to FIGS. 7A-7D, another use-case scenario will be described. Similar to the first use-case, this particular use-case may correspond to a scenario where a user 104 is approaching a door 616 that is protecting a physical asset such as a room, corridor, building, etc. In this scenario, the user 104 is not the only person within the sensing range 620 and/or active read area 624. Rather, a population of other persons 704 may also be within one or both of the sensing range 620 and active read area 624. This particular use-case highlights the effectiveness of first obtaining a credential ID associated with the user 104 and then using that credential ID to obtain one or more biometric templates for matching purposes. The process implemented in this use-case is similar to the process implemented as described in connection with FIGS. 6A-6D in that the reader 612 may obtain credential IDs for users within the active read area 624 and then create a subset of biometric templates for analysis against current biometric information of users passing through the sensing range 620. Different in this use-case, however, is the fact that multiple credential IDs may be obtained by the reader 612. This effectively means that 1:1 matching between a template and current biometric information may not be possible. Advantageously, however, it is still possible to minimize the number of biometric templates analyzed during a biometric comparison step. For instance, even if there are 100 persons in the population 704, it is unlikely that every person is carrying a credential or portable device 108. Thus, only biometric templates for recognized credential IDs will be obtained from the template library for further comparisons with current biometric information. Thus, it may be possible to move from a 1:10 type of matching process as opposed to 1:100 or 1:1000 matching process (depending upon how many credential IDs are recognized and how many persons are in the population 704). In particular, the reading device 612 will be able to make a quick access control decision if it only has to compare the biometric information for user 104 with one or a subset of all biometric templates stored in the template library. Furthermore, if one or more persons in the population 704 is not carrying a valid credential or portable device, then at least a template will not be pulled from the template library for that person as another user 104 approaches the door.

If the population of persons 704 includes some users carrying a valid credential or portable device 108 and those users are within the active read area 624, then the biometric templates for those users may be pulled from the template library for biometric matching against current biometric information obtained for user 104 by the biometric sensor 608. Unfortunately, this may result in a less than 1:1 optimal biometric matching as the user 104 approaches the match range 628 because more than one template may have been pulled from the template library due to the existence of other credentials or portable devices 108 within the active read area 624.

Embodiments of the present disclosure propose additional features or capabilities to further reduce the number of biometric templates used in a biometric matching process. For instance, distance between a credential or portable device 108 and the reading device 112 may be used to correlate a particular user 104 approaching the door 616 with a particular credential ID and, therefore, a particular biometric template. Distance can be calculated using any type of known indicator such as signal strength (e.g., Received Signal Strength Indicator (RSSI)), flight distance or time (e.g., Time of Flight (ToF)), angle of arrival (AoA), or combinations thereof. The number of templates pulled from the template library may further be reduced or limited to a particular user 104 approaching the match range 628 or showing an intent to enter the door 616. In particular, the reading device 612 may be enabled to determine which of the users in the sensing range 620 are exhibiting an intent to enter the door 616. Only users identified as having an intent may have their associated credential IDs used to pull a biometric template from the template library. All other users in the population of persons 700 may be ignored and their credential IDs may either not be read by the reading device 612 or may simply be ignored when read by the reading device 612. Alternatively or additionally, as discussed in connection with FIGS. 6A-6D, the biometric comparisons can be performed for the user 104 (and other users) in the sensing area 620. When a biometric match is found between the user's 104 current biometric information and a biometric template, then the user 104 may be granted "provisional" or "pending" access grant permission. Once an authorized (and previously verified) user 104 enters the intent area 628, the door 616 may be opened or otherwise controlled to admit the user 104 through the door/portal 616.

Figure 8:
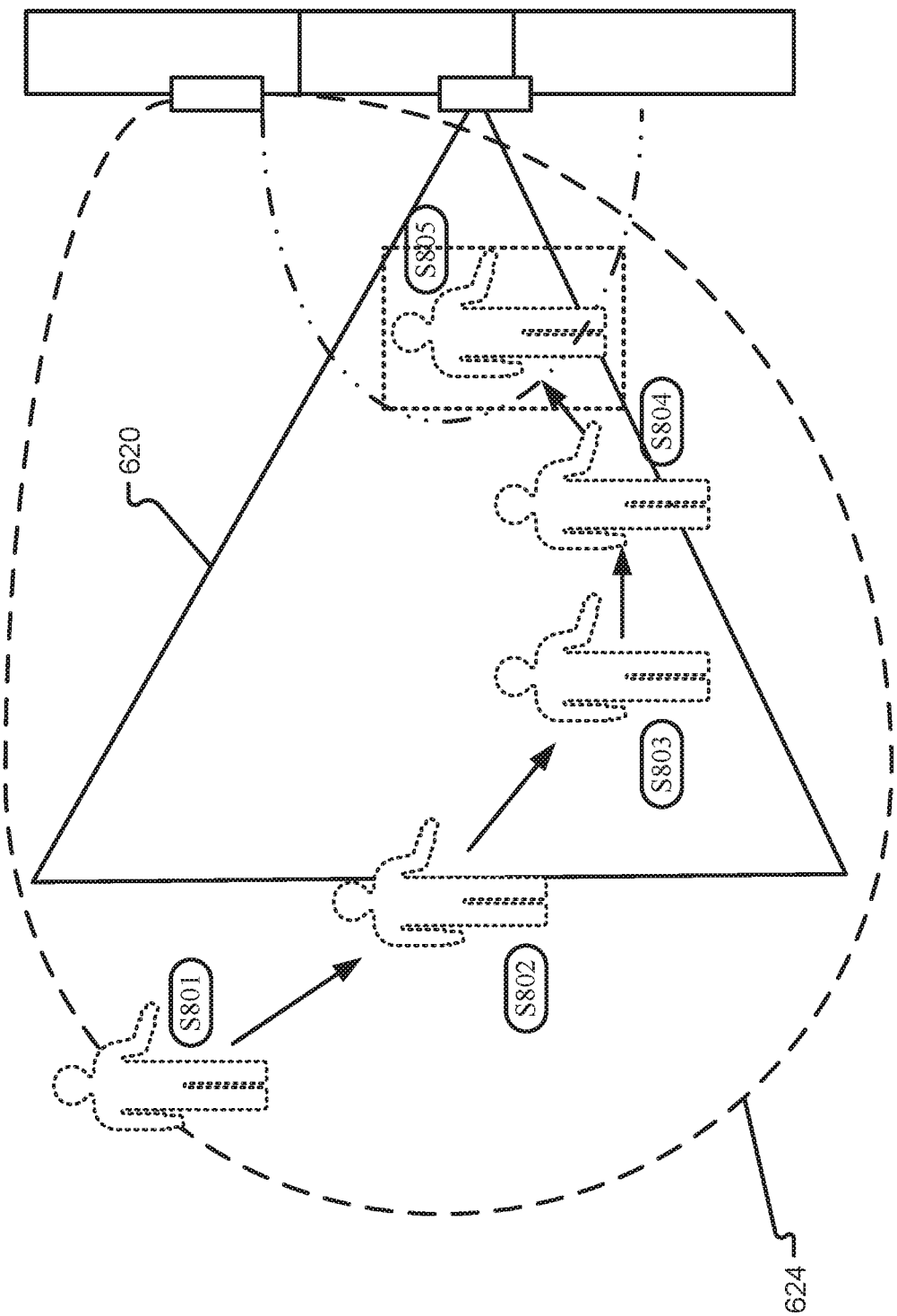
FIG. 8 depicts a user approaching a door or portal during a third use-case scenario in accordance with embodiments of the present disclosure.

With reference now to FIG. 8, a use-case scenario in which user intent is used to further limiting the number of biometric templates pulled from the template library will be described in accordance with at least some embodiments of the present disclosure. The user 104 is shown as being the only user in the active read area 624, but it should be appreciated that this use case can be employed in scenarios where multiple persons are within the active read area 624. This may help to move the reading device 612 from a 1:N matching to 1:N-1 or even a 1:1 matching between a biometric template and current biometric information for user 104.

Specifically, the user may start approaching the door 616 along a path not directed at the door 616. As the user 104 enters the active read area 624 (step S801), the credential ID from the user's 104 credential or portable device 108 may be received at the reading device 612. The user 104 may continue along a path not directed toward the door 616 until the user 104 enters the sensing range 620 of the biometric sensor 608 (step S802). The reading device 612 may not yet pull the user's biometric template (based on the already-received credential ID) because this user 104 has yet to exhibit an intent to enter the door 616. However, the user's 104 motion or travel path may still be monitored as the distance between the user 104 and door 616 decreases (step S803). Eventually, the user's 104 path of travel may become directed toward the door 616 (step S804).

If the intent analyzer 532 eventually recognizes that the user 104 has positively shown an intent to enter the door 616 and the user crosses a door action boundary (step S805), then the intent analyzer 532 may cause the reading device to pull the biometric template associated with the credential ID previously-obtained from the user's 104 credential or portable device 108. If the door action boundary is sufficiently sized (e.g., is small enough to ensure that no more than two or three persons could fit within the door action boundary), then the number of biometric templates compared with the current biometric information for the user 104 will be sufficiently small to possibly facilitate a 1:1 biometric match rather than requiring a 1:N match against templates of other users in the active read area 624. This effectively enables the reading device 612 to make an access control decision quick enough to allow the user 104 access through the door 616 if the user 104 is identified as a valid and trusted user while within the door action boundary. In some embodiments, this quick access control decision may enable the door 616 to be opened in an automated fashion without requiring the user 104 to pull their credential or portable device 108 from their pocket, purse, bag, or other area of storage all while enabling the door 616 to be automatically opened for the user 104.

Figure 9:
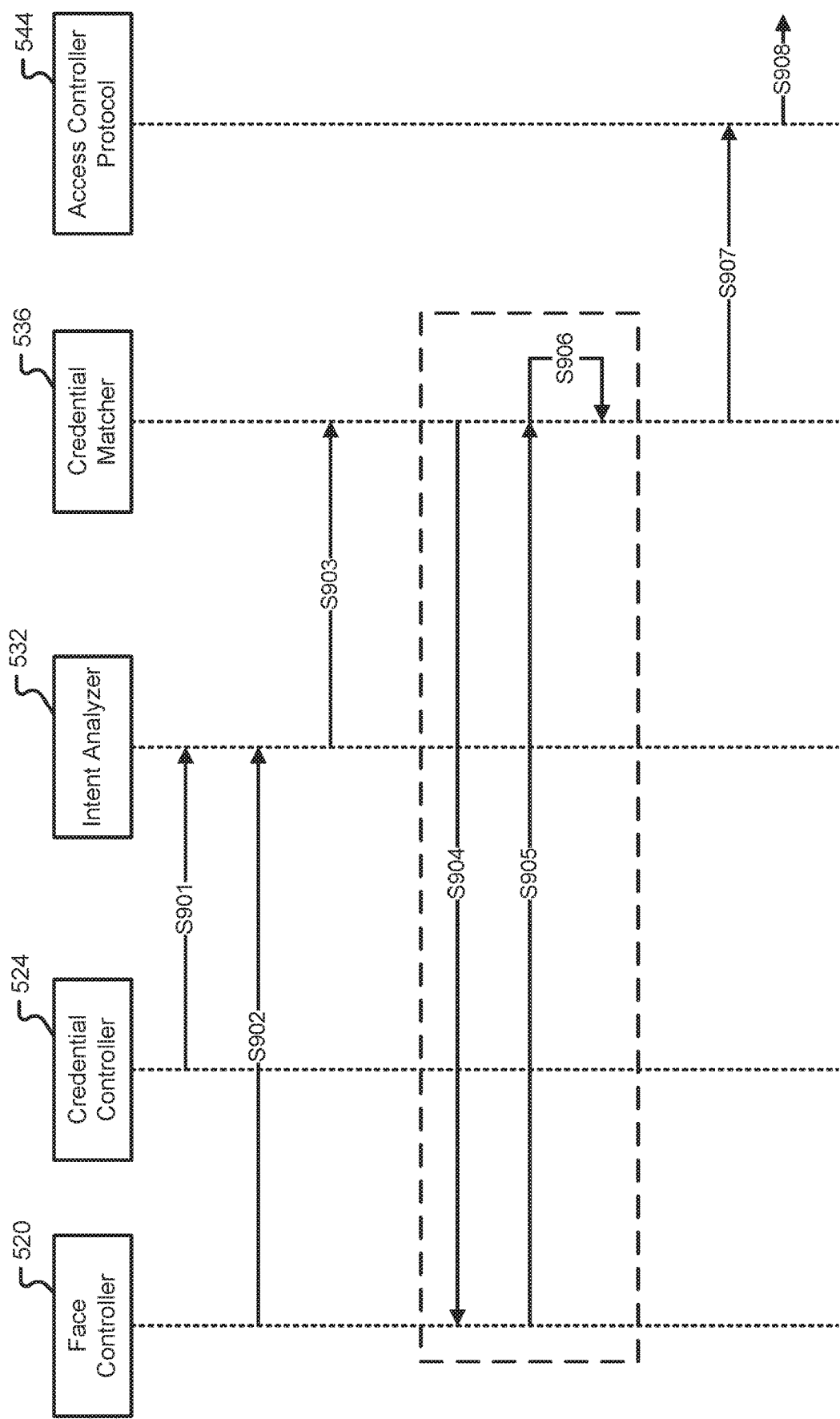
FIG. 9 is a diagram depicting message flows between components of an access control system in accordance with embodiments of the present disclosure.

With reference now to FIG. 9, additional details related to the operation of the reader system 404 components will be described in accordance with at least some embodiments of the present disclosure. The operational process begins when the credential controller 524 receives credential information from a reader unit 412, 416 and forwards that information to the intent analyzer 532 (step S901). In some embodiments, the credential information obtained at the credential controller 524 may include a credential ID along with other information associated with the credential. As a non-limiting example, the credential ID may be received at a signal from which RSSI, ToF, and/or AoA can also be obtained. The credential information provided to the intent analyzer 532 may, therefore, include the credential ID along with other associated signal information such as RSSI, ToF, and/or AoA.

The process continues when the face controller 520 provides biometric information related to one or more users in the sensing range 620 to the intent analyzer 532 (step S902). The information provided to the intent analyzer 532 in this step may include a listing of biometric information currently captured by the capture device 216 in a raw or processed state. For instance, a list of face handles, the face position in pixels, face size in pixels, distance from the sensor 616, and other information can be provided to the intent analyzer 532. As can be appreciated, the distance information received for a particular face may be correlated to a particular credential ID (e.g., via the RSSI, ToF, and/or AoA information). The intent analyzer 532 may provide the biometric information and credential information to the credential matcher 536 for further processing (step S903). In particular, the intent analyzer 532 may assume that face handles are consistent from frame-to-frame and if a user's intent is positively identified as wanting to pass through the door, then the associated biometric information and credential information for that user 104 may be provided to the credential matcher 536.

The credential matcher 536 may use the credential information (e.g., credential ID, RSSI, ToF, AoA, etc.) along with the biometric information (e.g., current biometric information, pixel information, facial size information, distance information, etc.) to begin performing a facial recognition process (steps S904). In particular, the credential matcher 536 may request that the facial controller 520 verify the current biometric information matches a biometric template selected from a template library for the user 104 approaching the door. The face controller 520 may compare the biometric information with the biometric template and produce a match score (step S905). The credential matcher 536 may check the match score against a predetermined match threshold as is known in biometric access control arts (step S906). The credential matcher 536 may be programmed to stop the comparisons on the first match (e.g., where a first match score meets or exceed the predetermined match threshold). If no matches are found, then the process will end. If, however, a match is found, then the credential matcher 536 will instruct the access controller protocol 544 to message the door controller 116 (step S907). In some embodiments, the credential matcher 536 will provide the access controller protocol with the credential ID for the now-admitted user 104, which will cause the access controller protocol to provide an actuation signal to the controller 116 (step S908).

Figure 10:
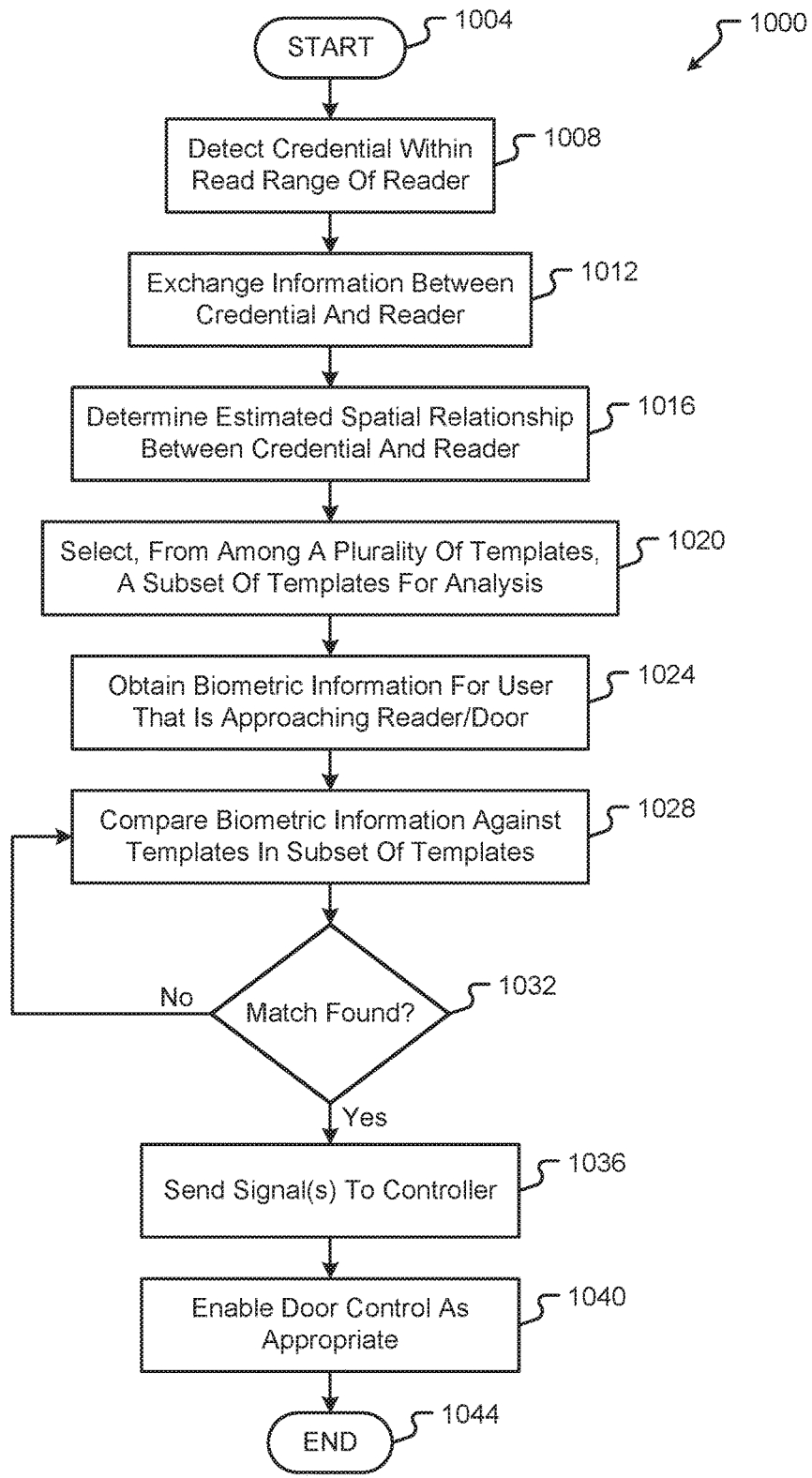
FIG. 10 is a flow diagram depicting a first method of maintaining security of a door or portal and permitting an automated actuation of the door or portal in accordance with embodiments of the present disclosure.

With reference now to FIG. 10, a method 1000 of maintaining security of a door or portal and permitting an automated actuation of the door or portal will be described in accordance with embodiments of the present disclosure. It should be appreciated that the method 1000 may be performed in connection with any of the access control systems, readers, reading devices, doors, and/or portals depicted and described herein. Moreover, although the steps of the method 1000 are shown as being in a particular order, embodiments of the present disclosure contemplate that one or more steps may be performed simultaneously with one another or in a different order than depicted.

The method 1000 begins with a start operation (step 1004) and continues when a credential or portable device is detected within an active read range of a reader, reading device, or reader system (referred to hereinafter as a "reader" for convenience) (step 1008). When a credential or portable device is detected, the method 1000 continues with the reader exchanging information with the credential or portable device (step 1012). In some embodiments, the devices may perform a mutual authentication to establish a baseline level of trust. After authentication, the credential or portable device may provide credential information to the reader in the form of a credential ID and other information that is stored in memory of the credential or portable device.

As credential information is exchanged, the reader may be configured to determine an estimated spatial relationship between itself and the credential or portable device (step 1016). In some embodiments, the estimated spatial relationship may be determined based on signal information obtained from the signal that carried the credential ID. As a non-limiting example, the reader may determine an RSSI, ToF, AoA, or other parameter associated with the signal transmitted by the credential or portable device. The estimated spatial relationship may correspond to an estimated linear distance between the reader and credential/portable device, an area or volume of space occupied by the credential/portable device, or an estimated point in space occupied by the credential/portable device.

Based on the credential ID and the estimated spatial relationship, the reader may select, from among a plurality of templates, a subset of templates for further analysis (step 1020). Said another way, the reader or a component thereof may utilize the estimated spatial relationship along with the credential ID (or other credential information) in connection with reducing the number of biometric templates that will be considered during a biometric comparison from all of its available biometric templates (e.g., N templates) to a subset of all available biometric templates (e.g., at least N-1 templates). Reduction of the number of biometric templates considered during a subsequent comparison step will help to increase the speed with which a biometric match (or lack of match) is made.

The method 1000 continues with the reader obtaining current biometric information for the user that is approaching the door (step 1024). In some embodiments, the current biometric information for the user may be associated with a particular credential ID based on the estimated spatial relationship. For instance, if the user is detected as being a particular distance away from an image capture device and a credential ID is also estimated to be about the same distance away from the reader (within a predetermined tolerance), then the user may be associated with the credential ID. Biometric information for that particular user may then be compared to the template that was obtained with the corresponding credential ID (step 1028). In some embodiments, a simple comparison of the current biometric information against the single biometric template associated with the credential ID may be performed. If a strong correlation between a single credential ID and a biometric template cannot be achieved, then at least a subset of the total number of biometric templates may be compared against the current biometric information for the user approaching the door. If a match is not found when the current biometric information is compared against a first biometric template (step 1032), then the method 1000 will continue comparing the current biometric information against other biometric templates (from among the selected subset) until a match is found or until all biometric templates have been analyzed and no match has been found.

If a match is found between the biometric template and the current biometric information, then the method continues with the reader sending one or more signals to a controller (step 1036). In some embodiments, a match condition may be found when the current biometric information matches the biometric template within some predetermined tolerance. As a non-limiting example, a match score may be assigned based on the number of common features between the current biometric information and the biometric template. If the match score is sufficient (e.g., equal to or greater than a predetermined match score), then a positive match may be found. Otherwise, no positive match is found.

The signal(s) sent to the controller may cause the controller to operate one or more actuators of an automated door as appropriate (step 1040). As a non-limiting example, if the door is a normally closed door, then the control signals associated with identifying a match in step 1032 may cause a lock of the door to be moved to an unlocked state and, optionally, the door may be actuated, rotated, slid, or swung such that a portal is opened and the user is allowed to pass through the now-opened portal. It should be appreciated that these automated actuations of the door may occur with the user ever having to physically present the credential/portable device to the reader (e.g., by placing the credential/portable device within a few centimeters of the reader). In some embodiments, a valid user may be given admittance through the door without requiring the user to break their stride as they walk toward the door. As another non-limiting example, if the door is a normally opened door, then the control signals associated with identifying a match in step 1032 may cause the door to remain in its current state (e.g., open and unlocked). If no match is found in step 1032, then the door may be moved to a closed and/or locked state. The method thereafter ends (step 1044).

Figure 11:
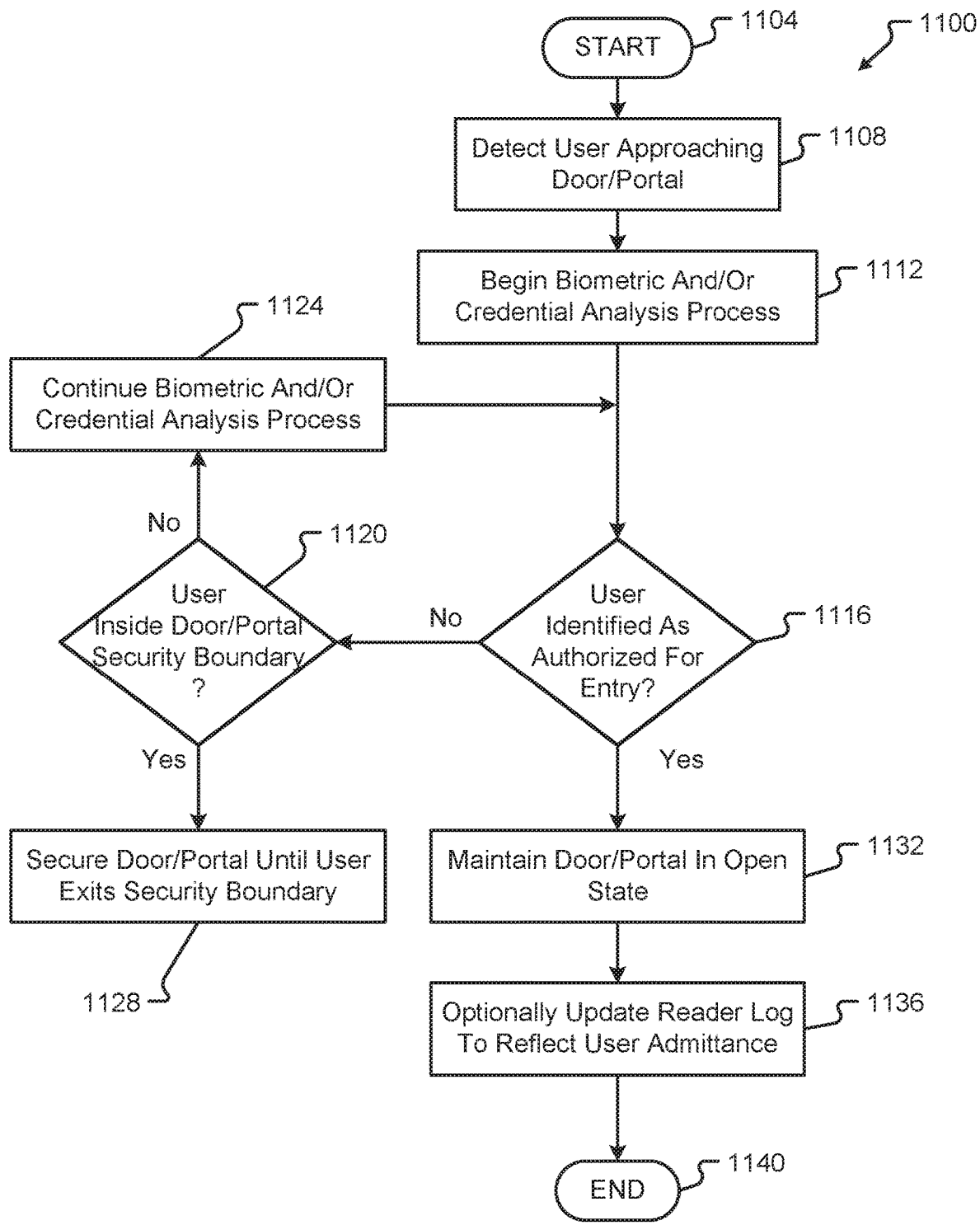
FIG. 11 is a flow diagram depicting a second method of maintaining security of a door or portal and permitting an automated actuation of the door or portal in accordance with embodiments of the present disclosure.

With reference now to FIG. 11, a second method 1100 of maintaining security of a door or portal and permitting an automated actuation of the door or portal will be described in accordance with embodiments of the present disclosure. It should be appreciated that the method 1100 may be performed in connection with any of the access control systems, readers, reading devices, doors, and/or portals depicted and described herein. Moreover, although the steps of the method 1100 are shown as being in a particular order, embodiments of the present disclosure contemplate that one or more steps may be performed simultaneous with one another or in a different order than depicted. This particular method may be performed in connection with a door or portal that is maintained in a normally opened state.

The method 1100 begins with a start operation (step 1104) and continues when a user is detected as approaching a door or portal (step 1108). The detection of a user may be facilitated with an image capture device, a biometric sensor, a reader, or combinations thereof. As the user approaches the door, the method 1100 continues by initiating a biometric and/or credential analysis process (step 1112). In some embodiments, the biometric and/or credential analysis process may be similar to method 1000 or any other biometric or credential analysis process depicted and described herein.

The method 1100 continues by determining whether the user approaching the door/portal is identified as an authorized user that is allowed permission to pass through the door/portal (step 1116). If this query is answered affirmatively, then the door/portal is maintained in its open state (step 1132). The method 1100 may continue by optionally updating a reader log to reflect that the identified user was granted admission through the door/portal and that the user actually passed through the door/portal (step 1136). Thereafter, the method ends (step 1140).

Referring back to step 1116, if the query is answered negatively, then the method proceeds by determining if the user is within a predetermined security boundary (step 1120). The predetermined security boundary may correspond to a predetermined distance away from the door. As a non-limiting example, the predetermined security boundary may correspond to a door action boundary. If the user is determined to be inside the predetermined security boundary, then the door/portal may be transitioned to a closed/secure state until the user exits the security boundary (step 1128). If the user is not within the predetermined security boundary, then the biometric and/or credential analysis process may continue for that user (and any other detected user) (step 1124). The method 1100 then returns to step 1116.

Figure 12:
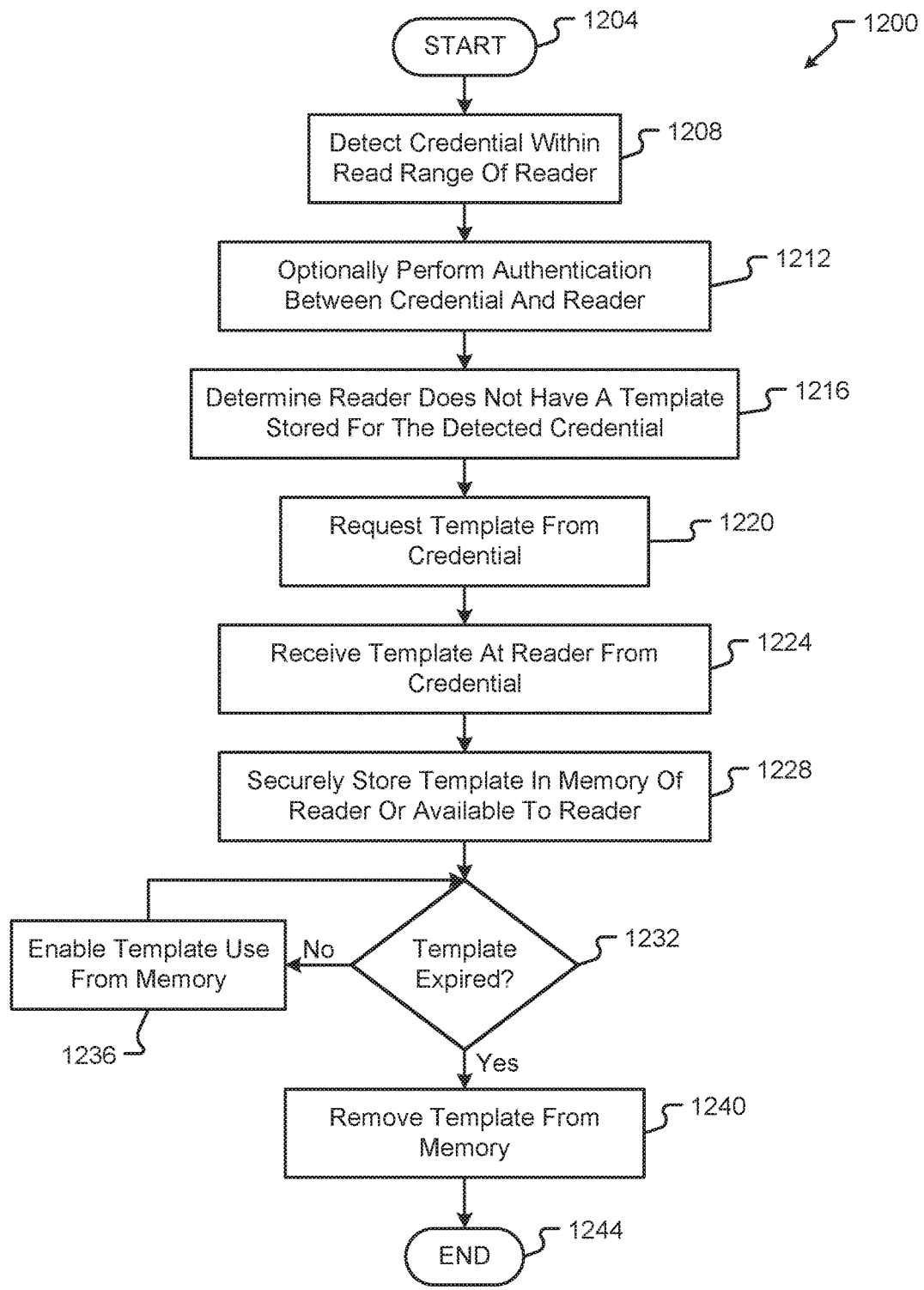
FIG. 12 is a flow diagram depicting a method of managing templates at a reader in accordance with embodiments of the present disclosure.

With reference now to FIG. 12, a method 1200 of managing templates at a reader will be described in accordance with embodiments of the present disclosure. It should be appreciated that the method 1200 may be performed in connection with any of the access control systems, readers, reading devices, doors, and/or portals depicted and described herein. Moreover, although the steps of the method 1200 are shown as being in a particular order, embodiments of the present disclosure contemplate that one or more steps may be performed simultaneous with one another or in a different order than depicted. The method 1200 may be performed in connection with managing one or multiple different biometric template types. Examples of such template types include, without limitation, retina templates, infrared signature templates, weight templates, iris templates, sclera templates, body shape templates, and gait templates.

The method 1200 begins with a start operation (step 1204) and continues when a credential or portable device is detected as being within a read range of a reader (step 1208). The read range of the reader may correspond to an active read area or the like. The method continues by optionally performing an authentication between the reader and credential/portable device (step 1212). As can be appreciated, this authentication step may include a mutual authentication or a one-way authentication.

Once the devices have properly completed the authentication process, the method 1200 continues by determining that the reader does not have a template stored for the detected credential/portable device (step 1216). Thus, the reader may determine that the presentation of the credential/portable device corresponds to a first use of the credential/portable device with the reader. In this situation, the reader may request one or more biometric templates from the detected credential/portable device (step 1220). This request may be transmitted over a secured (e.g., encrypted) wireless communication link. In response to receiving the request, the credential/portable device may generate an appropriate response that includes one or more biometric templates in a payload of a message to be transmitted to the reader (step 1224). The template may be transmitted to the reader in one or multiple messages over a secured communication channel (e.g., an encrypted channel).

The reader may receive the biometric template(s) at a credential interface and forward the template(s) along to an appropriately-secure area of memory (step 1228). In some embodiments, the biometric template(s) may be stored in a secure memory device that is local to the reader (e.g., within a common housing as other components of the reader). Alternatively, the biometric template(s) may be stored in a remote memory device (e.g., a remote database, a separate memory device, etc.)

Because the memory device used to store biometric templates may have a limited amount of storage space, it may be desirable to ensure that the memory is not completely consumed with biometric templates that are expired or otherwise have become stale due to lack of use by the reader. Accordingly, the method 1200 continues with the reader determining if the biometric template received from the credential/portable device has expired (step 1232). If this query is answered negatively, then the biometric template is maintained in memory and made available for subsequent use (step 1236). Subsequent uses of the biometric template may include retrieving the biometric template from the permanent area of storage and placing the biometric template into cache memory for comparison against biometric information associated with a user approaching the reader (which is mounted relatively near the door).

When it is determined that the biometric template has expired (e.g., due to lack of use over a specified time frame or due to timing-out), the method 1200 continues by removing the template from the secure memory area (step 1240). Furthermore, if the now-expired template is also found in cache memory or any other memory device, that instance of the template may also be removed, overwritten, or otherwise marked as unusable. Thereafter, the method ends (step 1244).

Figure 13:
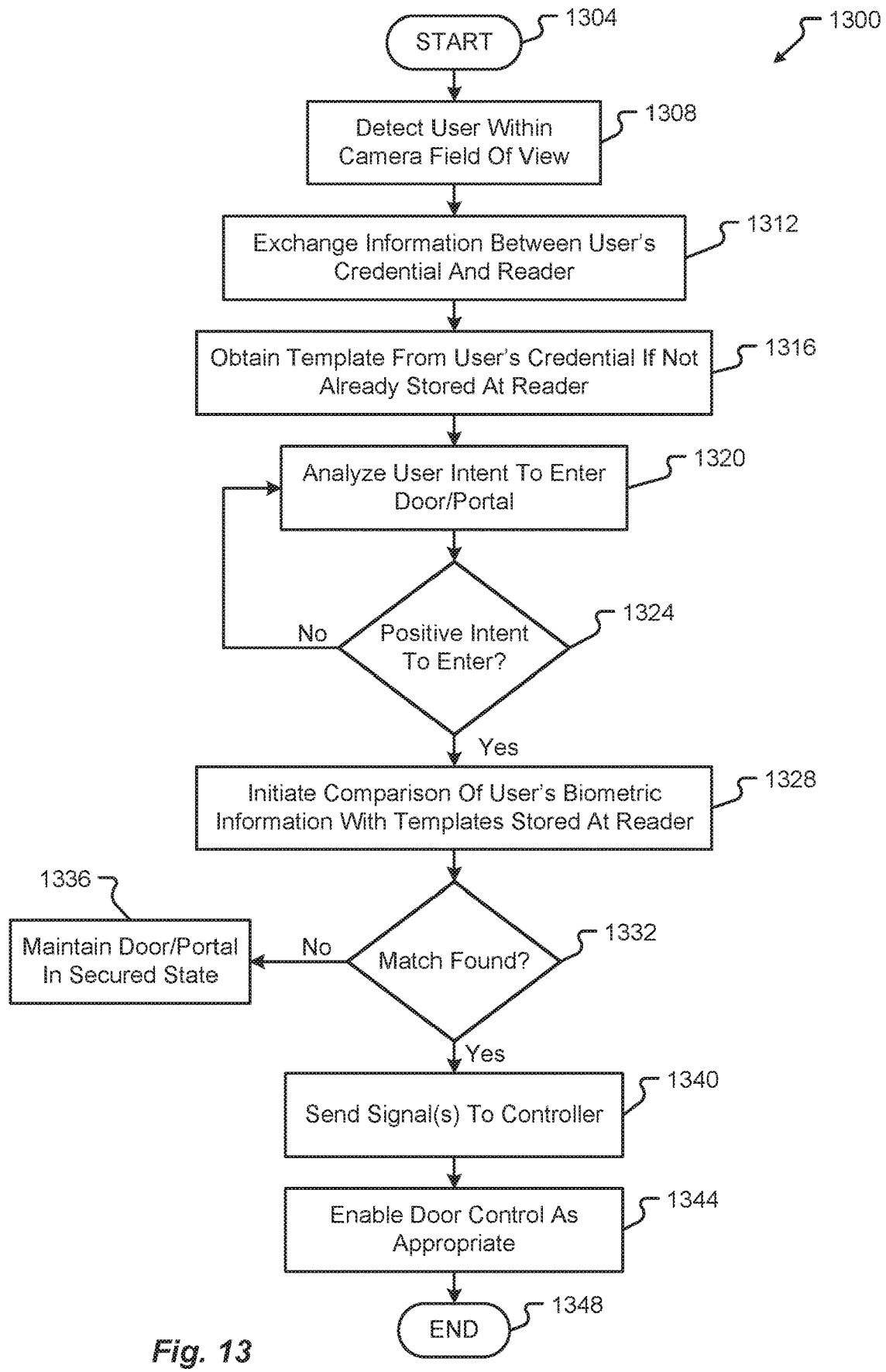
FIG. 13 is a flow diagram depicting a method of assessing user intent to enter a door or portal in accordance with embodiments of the present disclosure.

With reference now to FIG. 13, a method 1300 of assessing user intent to enter a door or portal will be described in accordance with embodiments of the present disclosure. It should be appreciated that the method 1300 may be performed in connection with any of the access control systems, readers, reading devices, doors, and/or portals depicted and described herein. Moreover, although the steps of the method 1300 are shown as being in a particular order, embodiments of the present disclosure contemplate that one or more steps may be performed simultaneous with one another or in a different order than depicted.

The method 1300 begins with a start operation (step 1304) and continues when a user is detected within a camera's field of view (step 1308). It should be appreciated that biometric sensors other than an image capture device or camera may be used, in which case the sensing area of those devices may be equivalent to the camera's field of view.

The method 1300 continues with the reader and credential/portable device exchanging information between one another (step 1312). In some embodiments, this exchange of information may include information sufficient to complete an authentication process. The exchanged information may further include a credential ID or some other credential information that is transmitted from the credential/portable device to the reader. The reader may further obtain one or more biometric templates from the user's credential/portable device if a biometric template is not already stored in local memory of the reader (step 1316).

The method continues with an analysis of the user's intent as they approach the door/portal (step 1320). In some embodiments, motion, travel path, estimate travel trajectory, gestures, gaze detection, and other aspects of the user's activity may be analyzed to determine if the user is exhibiting an intent to pass through the door/portal. If the user is identified as having a positive intent to enter the door/portal (step 1324), then the method will initiate a comparison of the user's biometric information obtained from the camera (or other biometric sensor) with one or more templates stored in memory of the reader or otherwise made accessible to the reader (step 1328).

During this comparison step, the reader may determine if a match is found between the user's current biometric information and any of the biometric templates being compared thereto (step 1332). If no match is found between the current biometric information and the biometric templates made available to the reader, then the door/portal will be maintained in a secured state (step 1336). If, however, a suitable match is found, then one or more appropriate control signals will be transmitted to a controller associated with the reader (step 1340). The controller, in response thereto, may enable door control as appropriate (step 1344). For instance, the controller may cause the door lock to move to an unlocked state and/or automatically move the door from a closed state to an opened state. Thereafter, the method ends (step 1348).

Referring back to step 1324, if no positive intent to enter is detected by the reader, then the method will revert back to step 1320 and further intent analysis will be performed. In some embodiments, by placing the intent analysis ahead of the biometric comparison stage, it may be possible to further reduce the number of biometric comparisons performed at the reader. In particular, it becomes possible to limit biometric comparisons to only those users that have been identified as exhibiting a positive intent to enter a door/portal. This may also reduce the number of biometric templates retrieved from the template library for comparison with the current biometric information—again further reducing the amount of time to complete a biometric comparison process.

Although the above description describes certain tasks as being performed by the reader or by the portable device of an access control system, some or all of such tasks may be performed by other components of an access control system without departing from the scope of the present disclosure. Moreover, while certain components were shown as being incorporated in a reader system or reading device, it should be appreciated that some components may be located remote from the reader system or reading device. For instance, a template database or library may be maintained remote from the reading device without departing from the scope of the present disclosure.

Furthermore, while embodiments of the present disclosure have been discussed in connection with automated doors (e.g., doors that open automatically), it should be appreciated that embodiments of the present disclosure are not so limited. For instance, it should be clear that embodiments of the present disclosure contemplate usage in simple systems that only unlock a door, even if that door does not automatically open.

As can be seen from the above description, the system disclosed herein is useful for allowing an access control system to identify a trusted environment and to apply a particular set of access control requirements when a trusted environment is identified. The system disclosed herein is also useful for allowing an access control system to identify a non-trusted environment and to apply a particular set of access control requirements when a non-trusted environment is identified. Specific details were given in the description to provide a thorough understanding of the embodiments. However, it will be understood by one of ordinary skill in the art that the embodiments may be practiced without these specific details. Persons of ordinary skill in the art will also understand that various embodiments described above may be used in combination with each other without departing from the scope of the present disclosure. In this disclosure, well-known circuits, processes, algorithms, structures, hardware, and techniques have been shown and described without unnecessary detail in order to avoid obscuring the embodiments.

What is claimed is:

1. A physical access control system, comprising:
   a biometric sensor mounted in proximity to a physical access control point; and
   a reader comprising:
   an antenna that enables the reader to wirelessly communicate with one or more access control credentials;
   a processor coupled to the antenna; and
   memory coupled to the processor that stores instructions thereon that are executable by the processor, the instructions comprising:
   instructions that determine an estimated spatial relationship between an access control credential within read range of the antenna and the reader;
   instructions that use the estimated spatial relationship to reduce a number of biometric templates that are analyzed by the processor in connection with determining whether or not a carrier of the access control credential is allowed to gain entry through the physical access control point, wherein the number of biometric templates are reduced from N templates to at least N-1 templates; and
   instructions that perform a comparison of biometric information obtained via a biometric sensor with one or more biometric templates in the reduced number of biometric templates.

2. The physical access control system of claim 1, wherein the estimated spatial relationship comprises an estimated distance between the access control credential and the reader.

3. The physical access control system of claim 2, wherein the estimated distance is determined using at least one of RSSI and ToF.

4. The physical access control system of claim 2, wherein the estimated spatial relationship further comprises an angle of arrival between the access control credential and the reader as measured by radio signals exchanged between the access control credential and the reader.

5. The physical access control system of claim 4, wherein the instructions further include instructions that determine a user's intent to enter the physical access control point in connection with determining whether to analyze an access control credential being carried by the user.

6. The physical access control system of claim 1, wherein the access control credential comprises a mobile communication device and wherein the antenna enables communication via a proximity-based communication protocol.

7. The physical access control system of claim 6, wherein the proximity-based communication protocol comprises Bluetooth.

8. The physical access control system of claim 1, wherein the instructions further include instructions that obtain at least one credential identifier (ID) from the access control credential and correlate the at least one credential ID to a template in the N-1 templates.

9. A method of maintaining security of a door and permitting an automated actuation of the door with a reader, the method comprising:
   determining an estimated spatial relationship between an access control credential and the reader;
   based on the estimated spatial relationship and an access control identifier (ID) communicated to the reader by the access control credential, selecting one or more templates from a database that contains a plurality of templates, wherein a number of templates in the selected one or more templates is less than the plurality of templates;
   obtaining biometric information for a user that is approaching the reader;
   comparing the obtained biometric information with only templates belonging to the selected one or more templates;
   based on the comparison, determining that the biometric information satisfies a template belonging to the selected one or more templates; and
   in response to determining that the biometric information satisfies the template, allowing the reader to automatically actuate the door or a component of the door.

10. The physical access control system of claim 1, wherein the biometric templates comprise facial templates.

11. The physical access control system of claim 1, wherein at least some of the biometric templates are stored in cache memory of the reader.

12. The physical access control system of claim 1, wherein the biometric templates comprise one or more of retina templates, infrared signature templates, weight templates, iris templates, sclera templates, body shape templates, and gait templates.

13. The physical access control system of claim 1, wherein a biometric template for a first user is stored on the access control credential and then is initially transmitted to the reader upon a first presentation of the access control credential to the reader and wherein the biometric template for the first user is then stored in cache memory of the reader after receiving the biometric template for the first user from the access control credential.

14. The method of claim 9, further comprising:
reading the template from the access control credential each time the user subsequently approaches the reader with the access control credential.

15. The method of claim 9, further comprising:
assigning the user a pending access grant status in response to determining that the biometric information satisfied the template belonging to the selected one or more templates;
waiting for the user to exhibit an intent to enter the door; and
only after determining that the user has exhibited an intent to enter the door, allowing the reader to automatically actuate the door or the component of the door.

16. The method of claim 15, further comprising:
storing the template in cache memory of the reader for a predetermined amount of time or until a predetermined event occurs; and
after the predetermined amount of time has expired or the predetermined event has occurred, causing the template to be removed from the cache memory.

17. The method of claim 15, wherein the user is determined to exhibit an intent to enter the door by moving within a predetermined distance of the door, by following a path directed toward the door, or by gaze detection.

18. The method of claim 15, wherein the user's intent to enter the door is measured, at least in part, by a size of the user's face, a number of pixels between the user's eyes, a number of pixels populated by the user's face, or by the determined estimated spatial relationship between an access control credential and the reader.

19. The method of claim 9, wherein the plurality of templates comprises facial templates and wherein the obtained biometric information comprises an image of the user captured with a camera having a field of view that at least partially coincides with a read range of the reader.

20. The method of claim 9, further comprising:
determining the user's intent to enter the door before comparing the obtained biometric information with the templates belonging to the selected one or more templates.

* * * * *